United States Patent [19]

Chao

[11] Patent Number: 5,179,552
[45] Date of Patent: Jan. 12, 1993

[54] CROSSPOINT MATRIX SWITCHING ELEMENT FOR A PACKET SWITCH

[75] Inventor: Hung-Hsiang J. Chao, Lincroft, N.J.

[73] Assignee: Bell Communications Research, Inc., Livingston, N.J.

[21] Appl. No.: 821,264

[22] Filed: Jan. 10, 1992

Related U.S. Application Data

[60] Continuation of Ser. No. 637,137, Jan. 3, 1991, abandoned, which is a division of Ser. No. 618,119, Nov. 26, 1990.

[51] Int. Cl.$^5$ .................................. H04Q 11/04
[52] U.S. Cl. ................................ 370/60; 370/60.1
[58] Field of Search .............. 370/60, 64.1, 60.1, 370/58.1

[56] References Cited

U.S. PATENT DOCUMENTS

| | | | |
|---|---|---|---|
| 4,516,238 | 5/1985 | Huang et al. | 370/60 |
| 4,550,397 | 10/1985 | Turner et al. | 370/60 |
| 4,630,260 | 12/1986 | Toy et al. | 370/60 |
| 4,656,622 | 4/1987 | Lea | 370/60 |
| 4,656,627 | 4/1987 | Hasley et al. | 370/85 |
| 4,661,947 | 4/1987 | Lea et al. | 370/60 |
| 4,692,917 | 9/1987 | Fujioka | 370/60 |

(List continued on next page.)

OTHER PUBLICATIONS

K. Y. Eng et al, "A Modular Broadband (ATM) Switch Architecture with Optimum Performance", Proceedings of the XIII International Switching Symposium, May 1990, Stockholm, Sweden, vol. IV, pp. 1–6.

J. N. Giacopelli et al, "Sunshine: A High Performance Self-Routing Broadband Packet Switch Architecture", Proceedings of the XIII International Switching Symposium, May 1990, Stockholm, Sweden, Paper 21, vol. III, pp. 123–129.

T. T. Lee et al, "A Broadband Optical Multicast Switch", Proceedings of the XIII International Switching Symposium, May 1990, Stockholm, Sweden, vol. III, pp. 7–13.

Y. Sakurai et al, "Large Scale ATM Multi-Stage Switching Network with Shared Buffer Memory Switches", Proceedings of the XIII International Switching Symposium, May 1990, Stockholm, Sweden, vol. IV, pp. 121–126.

H. Obara et al, "Self-Routing Space Switch Network Comprising Fast and Uniform Switch Elements", Electronics Letters, Mar. 15, 1990, vol. 26, No. 6, pp. 352–353.

M. Akata et al, "A 250Mb/s 32×32 CMOS Crosspoint LSI for ATM Switching Systems", Digest of Technical Papers for the 1990 IEEE International Solid State Circuits Conference, Feb. 1990, pp. 30–31.

K. Y. Eng et al, "A Growable Packet (ATM) Switch Architecture: Design Principles and Applications", Proceedings of IEEE Globecom '89, Dallas, Tex., Nov. 1989, pp. 1159–1165.

T. T. Lee, "A Modular Architecture for Very Large (List continued on next page.)

*Primary Examiner*—Douglas W. Olms
*Assistant Examiner*—T. Samuel
*Attorney, Agent, or Firm*—Leonard Charles Suchyta; James W. Falk

[57] ABSTRACT

A crosspoint matrix switching element and associated method for a large (e.g. approximately 1 Terabit/second) packet switch (200) or a non-buffer based statistical multiplexor (1810), using a crossbar matrix network in which, first, the output ports of individual switching elements (e.g. $1340_{1,1}$, $1340_{2,1}$) are partitioned into various groups (e.g. 1110) in order to share routing paths (links) (e.g. $1115_1, 1115_2, \ldots, 1115_K$) among the elements in any such group and, second, the outputs of each such group are themselves recursively partitioned into a succession of serially connected groups (e.g. 1140, 1160) that each provides a decreasing number of outputs until one such output is provided for each corresponding output port ($278_1, 278_2, \ldots, 278_N$) of the switch. The switching element includes a control circuit which compares corresponding bits of two incoming bit streams in specific time windows to generate control signals and a routing circuit responsive to the control signals for routing the two input bit streams alternatively to two data outputs.

9 Claims, 18 Drawing Sheets

U.S PATENT DOCUMENTS

| | | |
|---|---|---|
| 4,696,000 | 9/1987 | Payne, III ................. 370/60 |
| 4,751,697 | 6/1988 | Hunter et al. ............. 370/60 |
| 4,761,780 | 8/1988 | Bingham et al. ........... 370/60 |
| 4,780,870 | 10/1988 | McHarg et al. ........... 370/60 |
| 4,788,680 | 11/1988 | Kikuchi et al. ........... 370/58.1 |
| 4,797,880 | 1/1989 | Bussey et al. ............. 370/60 |
| 4,817,084 | 3/1989 | Arthurs et al. ............ 370/60 |
| 4,864,558 | 9/1989 | Imagawa et al. .......... 370/60 |
| 4,866,701 | 9/1989 | Giacopelli et al. ......... 370/60 |
| 4,893,304 | 1/1990 | Giacopelli et al. ......... 370/60 |
| 4,899,334 | 2/1990 | Shimizu .................... 370/60 |
| 4,899,335 | 2/1990 | Johnson, Jr. et al. ....... 370/60 |
| 4,910,730 | 3/1990 | Day et al. ................. 370/60 |
| 4,958,341 | 9/1990 | Hemmady et al. ......... 370/60.1 |
| 4,985,889 | 1/1991 | Frankish et al. ........... 370/60 |
| 4,995,032 | 2/1991 | Demichelis et al. ........ 370/60 |

OTHER PUBLICATIONS

Packet Switches", Proceedings of IEEE Globecom '89, Dallas, Tex., Nov. 1989, pp. 1801–1809.

H. Ahmadi et al, "A Survey of Modern High-Performance Switching Techniques", IEEE Journal on Selected Areas in Communications, vol. 7, No. 7, Sep. 1989, pp. 1091–1103.

H. Kuwahara et al, "A Shared Buffer Memory Switch for an ATM Exchange", International Conference on Communications—ICC '89, Boston, 1989, pp. 4.4.1–4.4.5.

H. Uematsu et al, "A Cell-Based Cross-Connect Switch for ATM Broadband Networks", Singapore International Conference on Networks 1989, pp. 1–6.

P. Newman, "A Fast Packet Switch for the Integrated Services Backbone Network", IEEE Journal on Selected Areas in Communications, vol. 6, No. 9, Dec. 1988, pp. 1468–1479.

A. Pattavina, "Multichannel Bandwidth Allocation in a Broadband Packet Switch", IEEE Journal on Selected Areas in Communications, vol. 6, No. 9, Dec. 1988, pp. 1489–1499.

H. Uematsu et al, "Study in a Self-Routing Switch Network with Mutual Control", Electronics and Communications in Japan, Part 1, vol. 71, No. 10, 1988, pp. 90–101.

B. Bingham et al, "Reservation-Based Contention Resolution Mechanism for Batcher-Banyan Packet Switches", Electronics Letters, Jun. 23, 1988, vol. 24, No. 13, pp. 772–773.

S. R. Li, "Theory of Periodic Contention and Its Application to Packet Switching", Proceedings of the Seventh Annual Joint Conference of the IEEE Computer and Communications Societies—Infocom '88, pp. 4A.1.1–4A.1.6.

J. Hui et al, "A Broadband Packet Switch for Integrated Transport", IEEE Journal on Selected Areas in Communications, vol. SAC-5, No. 8, Oct. 1987, pp. 1264–1273.

Y. Yeh et al, "The Knockout Switch: A Simple, Modular Architecture for High-Performance Packet Switching", IEEE Journal on Selected Areas in Communications, vol. SAC-5, No. 8, Oct. 1987, pp. 1274–1283.

J. J. Kulzer et al, "Statistical Switching Architectures for Future Services", International Switching Symposium ISS '84, Florence, Italy, May 7–11, 1984, Session 43A, Paper 1, pp. 1–5.

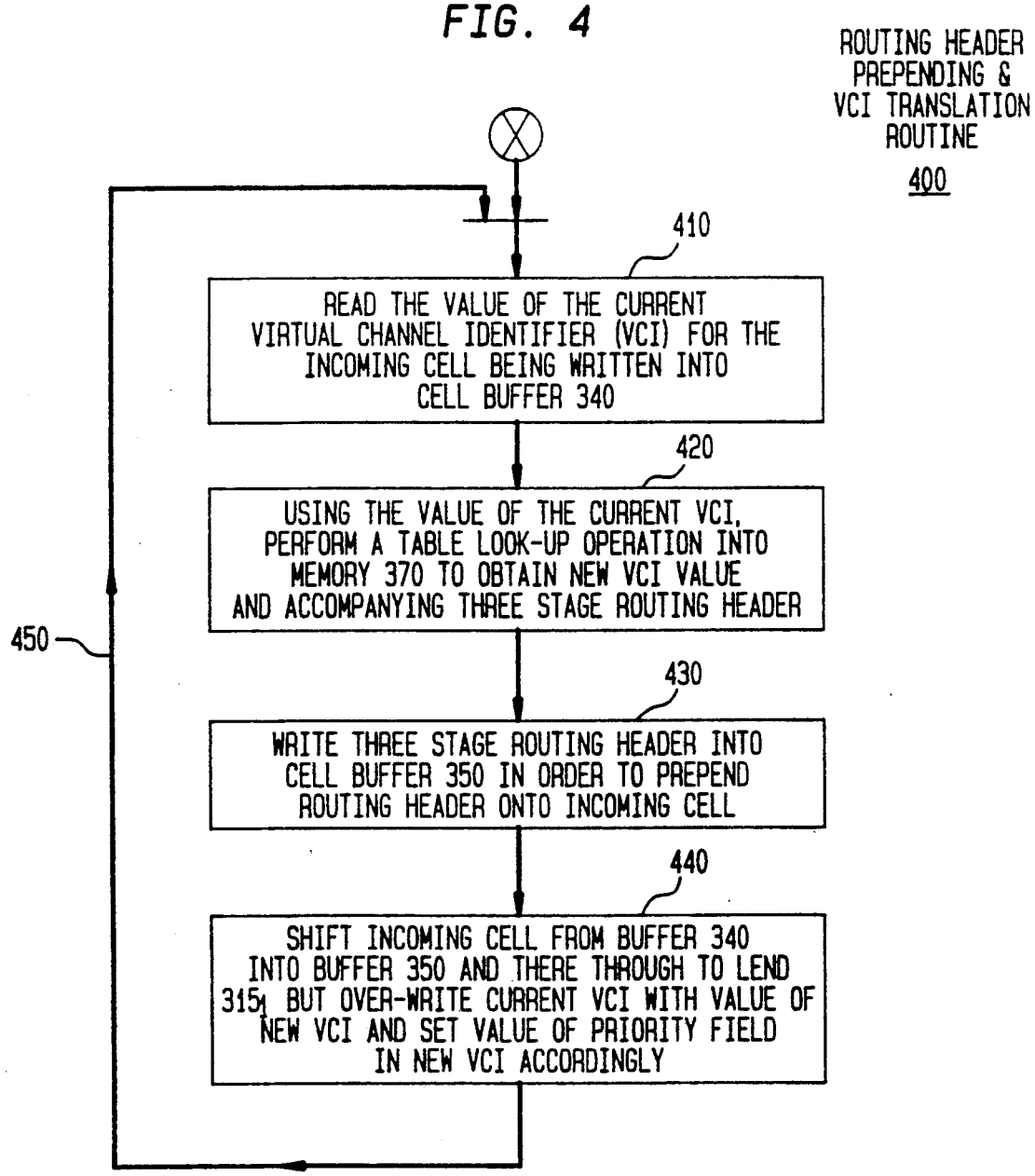

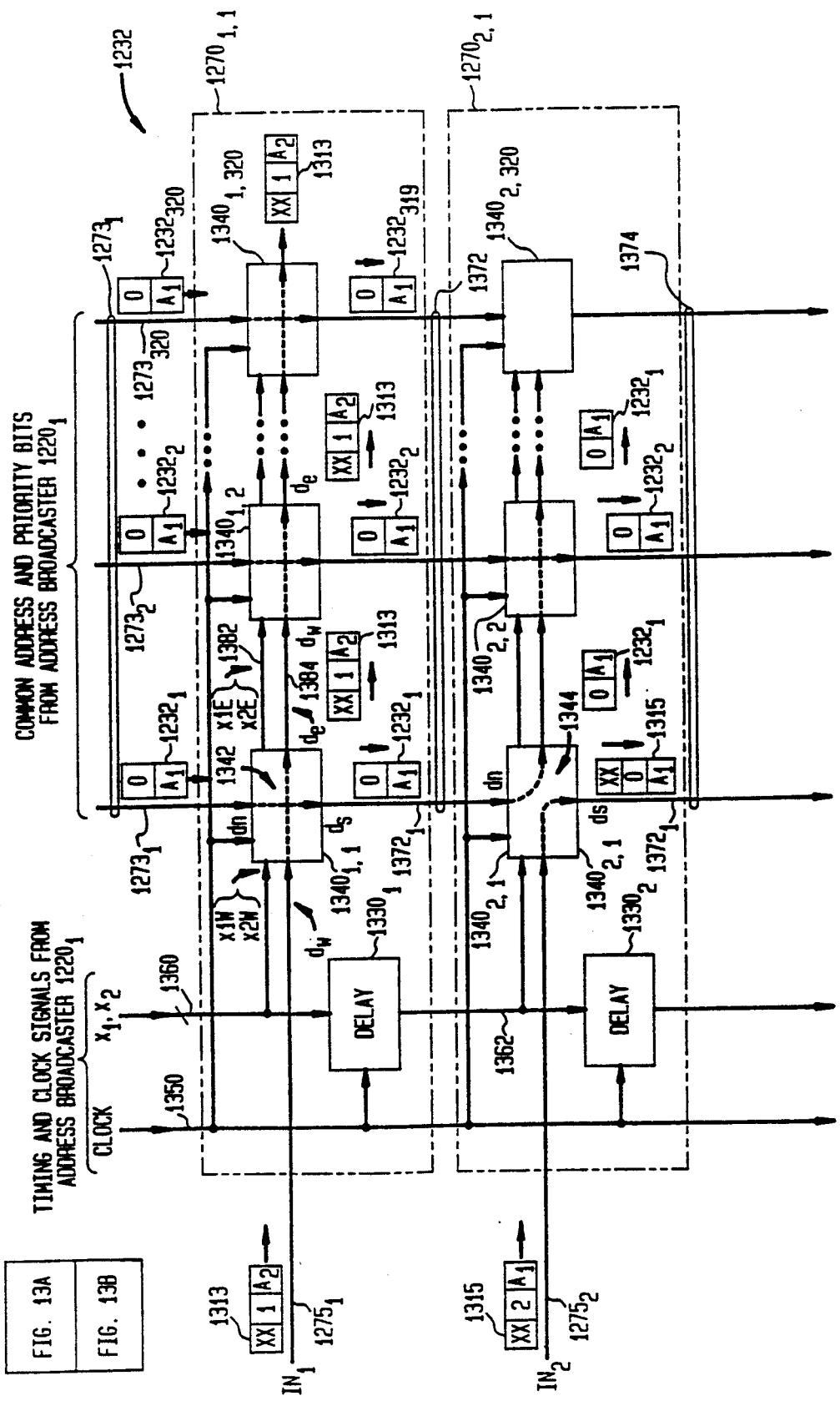

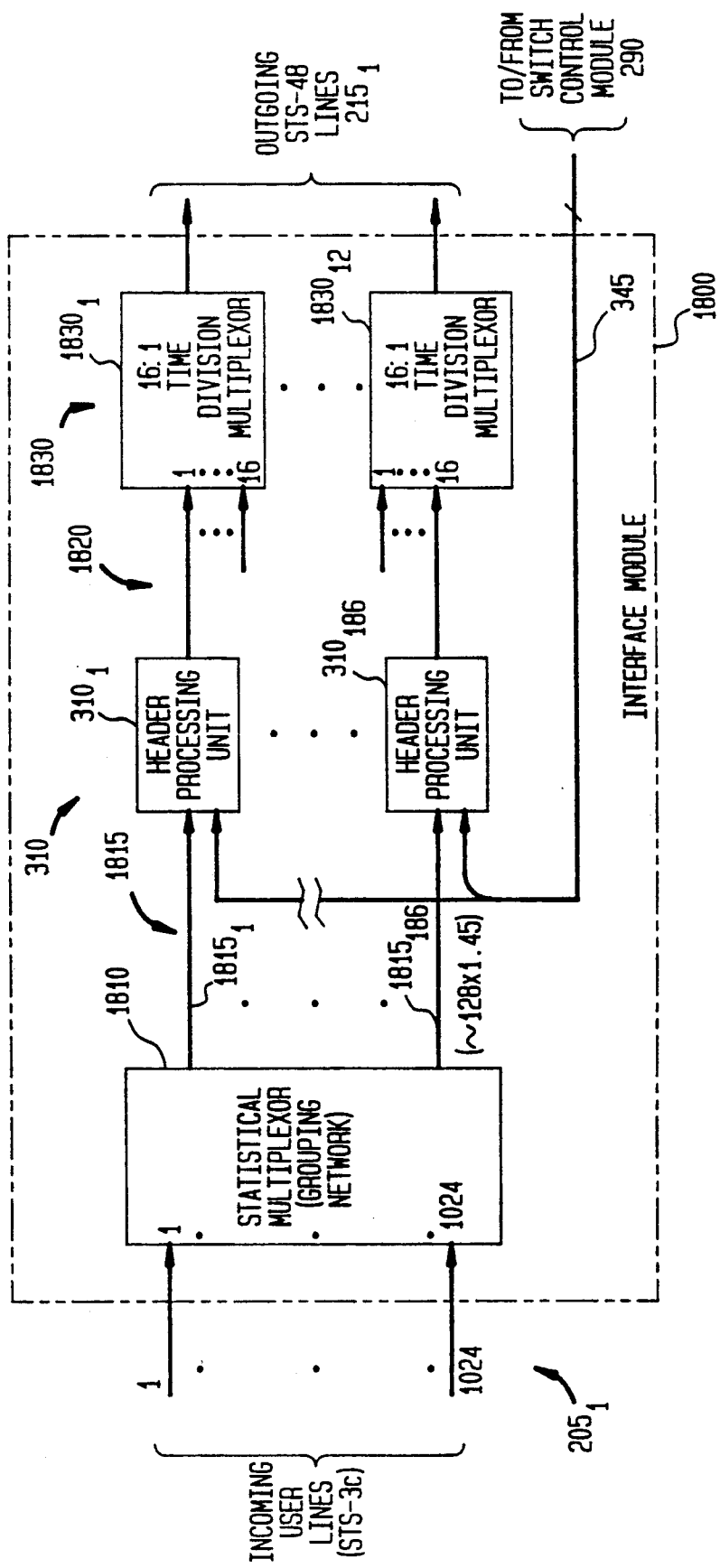

CROSSPOINT MATRIX SWITCHING ELEMENT FOR A PACKET SWITCH

This application is a continuation of application Ser. No. 637,137, filed Jan. 3, 1991, now abandoned, which was a division of application Ser. No. 618,119, filed Nov. 26, 1990.

BACKGROUND OF THE DISCLOSURE

1. Field of the Invention

The invention relates to apparatus, as well as to accompanying methods for use therein, for illustratively implementing a large (e.g. approximately 1 Terabit/second) packet switch or a non-buffer based statistical multiplexor, using a crossbar matrix network in which, first, the output ports of the individual switching elements are partitioned into various groups in order to share routing paths among the elements in any such group and, second, the outputs of each such group are themselves recursively partitioned into a succession of serially connected groups that each provides a decreasing number of outputs until one such output is provided for each corresponding output port of the switch. Such a switch also utilizes channel grouping to improve overall performance and a crossbar, e.g., crosspoint matrix, switching fabric that internally distributes contention resolution and filtering functions among the individual switching elements themselves to reduce complexity, provide modularity, reduce growth limitations and relax synchronization requirements of the entire switch.

2. Description of the Prior Art

Presently, the growing deployment of the public integrated services digital network (ISDN) throughout the nationwide telephone system permits each ISDN subscriber to gain access to a communication channel that possesses a significantly increased bandwidth over that available through a conventional telephone (i.e. POTS—plain old telephone service) connection. Although the bandwidth provided by basic rate ISDN service has the potential to provide a wide variety of new communication services to each of its subscribers, in the coming years various communication technologies that are just now emerging, such as broadband video and very high speed data transmission, are expected to impose bandwidth requirements on subscriber ISDN channels that will far exceed the bandwidth obtainable at a basic rate ISDN interface. Such an interface consists of two 64 kbit/second "B" channels and one 16 kbit/second "D" channel, where the "D" channel is a packet channel which carries signalling information for communication occurring over each B channel.

For example, broadband video service offerings might include: desktop teleconferencing having voice/video/data communication from a single terminal located at one's desk, distribution video, video-on-demand, videotelephone, still video picture services and high definition television. In terms of bandwidth, just one high definition television signal is expected to require, depending upon the manner in which it is encoded, at least 45 Mbit/second of channel bandwidth. Clearly, the bandwidth of such a signal far exceeds that furnished by a basic rate ISDN channel.

In an effort to provide sufficient channel bandwidth to meet expected subscriber demand in a public ISDN environment, the art has turned to implementing so-called broadband ISDN (B-ISDN). In B-ISDN, each subscriber channel is presently envisioned as providing an information transfer capacity of approximately 150 Mbit/second. This rate is chosen to provide a minimally sufficient bandwidth at a subscriber interface to simultaneously carry a broadband video service, such as high definition video, and various narrowband services, such as voice transmission. In addition, B-ISDN is also expected to serve as a high speed data transport facility for interconnecting separate local area networks (LANs). Presently, Ethernet based and many other types of LANs generally operate at a gross bit rate of approximately 10 Mbit/second. A proposed LAN, the Fiber Distributed Data Interface, is expected to operate at a gross bit rate of 125 Mbit/second. With this in mind, a bandwidth of 150 Mbit/second currently appears to be sufficiently fast to satisfactorily interconnect a wide variety of different LANs, encompassing those that are currently in use to many of those that are presently being proposed. Furthermore, B-ISDN must also fully accommodate relatively slow ISDN traffic, such as that which occurs at the basic rate.

ISDN involves a marriage of two different transport and switching technologies: circuit switching and packet switching. Circuit switching inherently involves continuously maintaining a real time communication channel at the full channel bandwidth between two points in order to continuously carry information therebetween throughout the duration of a call. Owing to this inherent characteristic, circuit switching can not efficiently accommodate bursty traffic and, for this reason, is generally viewed in the art as being ill suited for use in B-ISDN. Specifically, communication for many services that will occur at relatively low information transfer rates in a B-ISDN environment will appear as periodic bursts when transported over a B-ISDN subscriber channel. In addition, high speed data, such as that occurring over a LAN interconnection, will itself be bursty even apart from the channel. Bursty communications do not require full channel bandwidth at all times. Whenever a circuit switched connection is used to carry bursty traffic, available communication bandwidth that is dedicated to carrying data that occurs between successive bursts, i.e. whenever there is no information to be transferred, is simply wasted. Inasmuch as bursty communications, of one sort or another, are expected to constitute a significant portion of B-ISDN traffic, the significant inefficiencies that would otherwise result from using circuit switched connections to carry bursty traffic through a communication channel generally dictate against using circuit switched connections in a B-ISDN environment.

Despite the inherent limitation on carrying bursty traffic at high efficiencies over circuit switched connections, attempts are still being made in the art to adapt circuit switching to a B-ISDN environment. Nevertheless, while many advances have been and are continuing to be made in circuit switching technology, circuit switching still remains poorly adapted to supporting communication services that occur over widely diverse information transfer rates, such as those which are expected to occur in B-ISDN. For example, one attempt advocates overlaying a number of circuit switching fabrics to form a network, with each different fabric operating at a transfer rate of a single prominent broad- or narrowband service. Unfortunately, if this attempt were to be implemented, then segregated switching fabrics would likely proliferate throughout the public telephone network which would disadvantageously and unnecessarily complicate the tasks of provisioning, maintaining and operating the network. Hence, this attempt is not favored in the art. Another attempt in the art aims at providing multi-rate switching. Here, a single group of allocated channels would provide information transport, with each channel providing information transport at a different multiple of a basic transfer rate. A switch would then be dynamically reconfigured, based upon each subscriber's needs, to support specific services therefor that occur at different transfer rates. Unfortunately and disadvantageously, the resulting switch would be considerably more complex than a single rate circuit switch. Furthermore, all channels in a group would need to be synchronized with respect to each other and with no differential delay occurring thereamong. Owing to the need from time to time to switch calls from one physical facility to another as required by network maintenance, maintaining the necessary intra-group synchronization is likely to be quite difficult. As such, this proposal is also not favored. In this regard, see, H. Ahmadi et al, "A Survey of Modern High-Performance Switching Techniques", *IEEE Journal on Selected Areas in Communications*, Vol. 7, No. 7, Sep. 1989, pages 1091-1103 (hereinafter referred to as the Ahmadi et al publication); and J. J. Kulzer et al, "Statistical Switching Architectures for Future Services", *International Switching Symposium ISS'84*, Florence, Italy, 7-11 May 1984. Session 43A, paper 1, pages 1-5 (hereinafter referred to as the Kulzer et al publication).

Given the drawbacks associated with circuit switched connections, packet switched connections, specifically using asynchronous transfer mode (ATM), presently appear to be the preferred mode of communication over B-ISDN. This mode involves asynchronous time division multiplexing and fast (high speed) packet switching. In essence, ATM relies on asynchronously transporting information in the form of specialized packets, i.e. so-called ATM "cells". Each ATM cell includes a header followed by accompanying data. The header contains a label, which is used for multiplexing and routing, that uniquely identifies the B-ISDN channel which is to carry that cell between two network nodes. A specific periodic time slot is not assigned to carry a cell on any B-ISDN channel. Rather, once an ATM cell reaches, for example, a B-ISDN switch, fast packet switching occurs: a route is dynamically established through the switch to an output destination for that particular cell followed by transport of the cell over that route, and so on for each successive cell. A route is only established in response to the cell reaching an input of the switch.

Advantageously, ATM communication allows any arbitrary information transfer rate up to the full facility rate to be supported for a B-ISDN service by simply transmitting cells at a corresponding frequency into the network. With ATM, channel bandwidth is dynamically allocated to any B-ISDN call and simply varies with the rate at which cells for that call are applied through a B-ISDN channel. No further intervention is required by either the subscriber or the network itself to utilize differing amounts of available channel bandwidth as the need therefor arises. Any change in that subscriber's traffic patterns or services, even if dramatic, merely results in a changing mix of cells that are presented to the network for these services and changes in their corresponding rates of occurrence. As long as sufficient bandwidth is available on any subscriber channel to carry all the cells presented thereto, the ATM switching fabric merely continues to route cells to their appropriate destinations and remains essentially unaffected by any such change. Hence by decoupling the information transfer rates from the physical characteristics of the switching fabric and providing the capability to handle bursty traffic, ATM is particularly well suited to transporting both bursty and continuous bit rate services and is therefore preferred for B-ISDN service. In this regard, see the Kulzer et al publication.

An essential ingredient of B-ISDN is an ATM switch. In order to support B-ISDN, that switch needs to possess the capability of routing cells at an information transfer rate of at least 150 Mbit/second between separate ATM ports. Based upon current estimates, a large central office B-ISDN switch is expected to handle approximately 80,000 subscriber lines each having a 150 Mbit/second channel With a concentration ratio of 10 to 1, the switch needs to possess a total throughput of approximately 1.2 Terabit/second ($1.2 \times 10^{12}$ bits/second).

Crossbar based switch architectures have received a great deal of attention in the art. The reason for this is simple crossbar switches have historically proven to be very reliable under actual service conditions and, are internally non-blocking, i.e. once appropriate connections are established through a cross bar matrix at any given time there will be no contention for any link residing within that matrix and thereby two cells will not collide within the matrix. See, e.g. U.S. Pat. No. 4,692,917 (issued to M. Fujoika on Sep. 8, 1987). Crossbar switches also possess the capability of being able to dynamically isolate a number of separate switching elements from active service without significantly affecting the throughput of the entire switch However, crossbar switches possess several drawbacks which must be adequately addressed in any switch design First, crossbar switches suffer from output port contention, i.e. two or more packets attempting to simultaneously appear at the same output port. Due to the non-deterministic (random) nature of packet arrival times and destinations, contention can occur in any packet switch architecture. Second and more significantly, crossbar type switches tend to contain a very substantial number of crosspoint elements and interconnects. In particular, since each of N inputs is connected to each of N outputs, a crossbar matrix contains $N^2$ crosspoint elements and interconnections. Inasmuch as a 1 Terabit/second switch for B-ISDN service is expected to service approximately 6000-8000 (or more) input ports, this necessitates that a crossbar matrix for use in such a switch must contain approximately 36-64 Million (or more) separate crosspoints and a similar number of interconnections. Such a large number of crosspoints and interconnections is not only very complex to implement but also inordinately costly. Furthermore, crossbar based switches frequently rely on using centralized circuitry to control routing and perform contention resolution. Use of such circuitry further complicates the interconnect wiring owing to the additional wiring needed to connect the centralized circuitry to and from each individual switching element. This added complexity may rival or even exceed that required within the crossbar matrix itself. As such and principally because of the resulting cost and complexity, the art teaches that a single stage crosspoint matrix should be used only in those instances where the packet switch is relatively small or where a relatively small crosspoint matrix forms a building block of a large multi-stage switch. In this regard, see pages 1098 and 1099 of the Ahmadi et al publication as well as pages 4 and 5 of the Kulzer et al publication.

Nevertheless, owing to the advantages inherent in crossbar based switches which are not present or readily attainable in other well-known switch architectures, such as Batcher-Banyan and other designs that rely on cascaded routing networks, significant work has been undertaken in the art to modify a crossbar matrix in an effort to ameliorate the disadvantages heretofore associated with using a crossbar matrix in a large packet switch.

Output port contention can be remedied by incorporating a queue, specifically buffers, in one or more locations in the switch to store one (or more) contending packets for an output port while another contending packet is routed through that port. For a crossbar switch, a buffer(s) can be placed at the input ports, at the output ports or within each crosspoint element itself. Use of such a buffer along with associated centralized control circuitry can, depending upon the location of the buffer(s), significantly increase the cost and complexity of the switch. In this regard, buffer placement and size tend to be critical issues in switch design. Increasing the number of buffers generally increases the throughput of the switch, i.e. the load that can be carried before packets are lost, but at the expense of added hardware and associated delay in transporting packets through the switch. The art teaches that, in resolving contention, output port buffering provides the highest switch throughput as compared to the input or crosspoint based buffering and is therefore the favored approach. In this regard, see page 1096 of the Ahmadi et al publication.

With this in mind, the art has recently proposed a crossbar based architecture for a large, high speed, e.g. approximately 1 Terabit/second, packet switch, such as that suited for ATM service, which incorporates output buffering. This architecture, which is referred to as the so-called "Knockout" switch and is currently receiving relatively wide attention in the art, is aimed at reducing the number of interconnections occurring between all the switching elements and a centralized controller and hence some of the cost and complexity associated with implementing a large packet switch from a large crossbar matrix as well as providing increased delay/throughput performance. See, for example, Y. Yeh et al, "The Knockout Switch: A Simple, Modular Architecture for High-Performance Packet Switching", *IEEE Journal on Selected Areas in Communications*, Vol. SAC-5, No. 8, Oct. 1987, pages 1274-1283; and H. Ahmadi et al, "A Survey of Modern High-Performance Switching Techniques", *IEEE Journal on Selected Areas in Communications*, Vol. 7, No. 7, Sep. 1989, pages 1091-1103. In essence, a Knockout switch contains a separate input line for each input; with N such inputs, the switch contains N such lines as well as N separate routing paths extending therefrom to each of N associated interfaces. Incoming packets on any one input are broadcast over the corresponding input line to all N routing paths connected to that line. Each such interface contains N packet filters, an N-to-L concentrator (where the value of N is substantially greater than the value of L) and a shifter and shared buffer. Each packet filter is connected to a different one of the N input lines. The outputs of each packet filter feeds the concentrator which, in turn, feeds the shifter and shared buffer. Operationally speaking, each of the packet filters receives incoming packets from a particular input line and examines the routing header in each of these packets. Within any one output port, the packet filter routes only those packets, which possess a routing address that matches the address for the particular output port, onward on to an input of the concentrator. In this manner, the packet filters provide a self-routing function. The concentrator then selects L packets from its N incoming lines. The L packets are stored in their order of arrival in the shared buffer. Stored packets are then shifted out of the shared buffer in seriatim and applied to an appropriate output interface module which, in turn, applies the packets to an output port of the switch. If more than L packets are simultaneously routed through the packet filters to the concentrator, the concentrator simply drops out, i.e. knocks out, all the excess packets therefrom. Owing to the error detection and correction capabilities (including packet re-transmission) inherent in a packet, particularly ATM, network, a relatively small amount of cell loss can be readily tolerated. Due to the natural randomness of the arriving cells, the art has specifically observed that if the value of L is sufficiently large, then the probability of L simultaneously occurring packets being routed to the same output port in one ATM cell time interval is very small. For example, if L is set to twelve, and assuming uncorrelated packet traffic occurs among the input ports with uniform packet distribution by the concentrator, then the probability that more than 12 ATM cells will be destined to at any one output port during a single ATM cell time interval becomes approximately $10^{-10}$. Inasmuch as the expected cell loss of an optical fiber link and associated circuitry is expected to be on the order of $10^{-9}$, the cell loss inherent in the knockout switch is acceptable and, for non-real time services, can be readily compensated by appropriate re-transmission of "knocked out" cells. Since cell knockout and concentration of remaining cells effectively resolve contention within any one output port, a knockout based switch does not need a centralized circuit to resolve contention. Moreover, since all the bus interfaces in such a switch collectively implement a self-routing function, a centralized circuit to control routing is not needed either. While the elimination of such a centralized control circuit significantly reduces the interconnect wiring by eradicating the wiring heretofore required by that circuit, a substantial number of interconnects still remains. In this regard, as discussed above, each interface in a knockout switch is connected to every one of the N input lines thereby necessitating for an N line switch, $N^2$ separate interconnections. For a large switch (e.g. N=approximately 8000), a large number of interconnections is still quite complex and costly to implement.

Thus, a need exists in the art for a large, e.g. at least 1 Terabit/second, packet switch particularly suited for use with ATM communication that utilizes the knockout principle but with a markedly reduced number of interconnections within the switch fabric over that required by conventional knockout switches known in the art.

SUMMARY OF THE INVENTION

My inventive large capacity packet switch substantially eliminates the deficiencies associated with knockout type packet switches known in the art. Specifically, my inventive architecture, while based upon the knockout principle, requires substantially fewer interconnections within a crossbar matrix than heretofore required by knockout switches known in the art.

First, in accordance with specific teachings of my invention, if each crosspoint switching element used within a knockout switch also contained a packet filtering capability, then the packet filters could be distributed into the switching elements themselves thereby eliminating the need to utilize $N^2$ separate packet filters and associated interconnections. As such, only L separate lines would need to be routed to each output buffer. While this inventive arrangement, which I refer to as a "distributed knockout switch", substantially reduces the number of interconnects between the "N" input lines and the output buffers to $L \times N$ rather than $N^2$, nevertheless, it still requires a relatively large number of switching elements, i.e. $L \times N^2$. In this regard, if the value of "L" is set to twelve, then $12N^2$ switching elements would be required. A switching element, due to economies achievable through circuit integration, is likely to be much less expensive than a wired interconnect. Moreover, due to the uniformity and regularity with which these elements are interconnected, a high level of circuit integration could be achieved to further reduce the cost of all these elements. However, for a switch with large N, upwards of 6000–8000 inputs such as in a 1 Terabit/second ATM switch, the number of such switching elements that would be required in such a switch is still exceedingly large.

Accordingly, I have extended the teachings of my distributed knockout switch to result in an inventive switch architecture, hereinafter referred to as a "recursively grouped distributed knockout switch", that not only substantially reduces the number of wiring interconnects associated within a crossbar matrix contained in a conventional knockout type switch but also advantageously and significantly reduces the number of individual switching elements that heretofore would be required in my distributed knockout switch by approximately one order of magnitude.

In particular, my inventive recursively grouped distributed knockout switch utilizes a succession of routing stages and extends the principle of sharing, as used within the switching matrix itself in my distributed knockout switch, to encompass output sharing between successive routing stages. Instead of just providing only one output line for each group of "L" shared vertical interconnection lines (links) as occurs in my distributed knockout switch, my recursively grouped distributed knockout switch also shares a group of "M" separate output lines for each routing stage among a group of shared interconnection lines and then applies link and output sharing on a recursive basis, to implement multiple levels of output sharing, within the crossbar matrix.

Each separate stage is implemented through a grouping network. The input lines presented to each grouping network in a given stage consists of a group of shared output lines provided by the immediately previous stage, or for the first stage, all the input lines applied to the distributed knockout switch. The number of shared output lines in any group is set to a number which assures that the probability of lost cells resulting from contention occurring among incoming cells for simultaneous routing to all these output lines is sufficiently low, e.g. $10^{-10}$. For example, if 256 separate shared output lines are to be provided among N input lines, then, to provide a cell loss probability of $10^{-10}$, the number of shared output lines in any one shared group can be reduced from 12N to 1.25N. Hence, for 8192 input lines, each shared output group would need to provide 320 output lines ($256 \times 1.25$). Each of these output groups would then form the input lines to a next successive grouping network which itself provides groups of shared output lines, and so on, all the while reducing the number of shared output lines produced by each successive grouping network until only one output is provided by the last stage. This single output provided per stage would serve as an output port of the switch. An 8192 input ATM packet switch could be implemented with three serially connected stages of grouping networks: the first stage providing 256 separate shared output groups of 320 shared output lines each for all 8192 inputs; the second stage providing 8 separate shared output groups of 64 shared output lines for each incoming group of 320 lines from the first stage; and the third stage providing 32 groups of 12 output lines each for each incoming group of 64 lines from the second stage. To provide appropriate output synchronization, an output buffer statistically multiplexes the cells appearing on each group of 12 shared output lines and stores the multiplexed cells in an internal queue. The queue is then sequentially read with a serial bit-stream produced thereby being applied to an associated output port of the switch. Alternatively, each third stage grouping network and its associated output buffers could be replaced with an appropriate concentrator, implemented using either time or space division multiplexing, to provide a group of shared output channels for carriage over, for example, a single trunked connection.

Each grouping network is formed of multiple paralleled equal sized matrices of rows and columns of identical switching elements. Each separate matrix provides a shared output group with the number of switching elements in each column being equal to the number of shared output lines within that group. The number of rows in each matrix equals the number of input lines provided to that grouping network. The switching elements within each such matrix are serially connected in a daisy-chained fashion both horizontally and vertically to simultaneously distribute cells as well as accompanying timing and clock signals from one switching element to the next within that matrix. Each of these switching elements simultaneously receives incoming cells from two directions: from the top (north) or left (west) and resolves contention between these cells, both in terms of prepended cell addresses and priority information, and routes these cells either in a crossed pattern, i.e. to the bottom (south) and right (east), respectively, or in a non-crossed pattern, i.e. to the east and south respectively, to successive switching elements in the same matrix. As such, incoming ATM cells successively propagate to the right within any matrix, with high priority cells being given priority over low priority cells for any one shared output line in that group. If more cells are contending for a given number of output lines, then the excess cells are merely dropped off, i.e. "knocked out".

By distributing the contention resolution function throughout the individual switching elements themselves, this advantageously eliminates the need to incorporate a centralized contention resolution device in my switch thereby substantially simplifying the resulting interconnect wiring used within the switch fabric.

Moreover, since none of the switching elements contains a buffer, my inventive recursively grouped distributed knockout switch advantageously preserves the ordering of incoming cells as they transit through the switch. Furthermore, since the interconnect wiring between adjacent switching elements is short and regular, relatively little power is needed to drive each of these interconnects thereby allowing relatively small drivers to be used in each of these elements. This, in turn, advantageously reduces the power requirements and heat dissipation associated with each of these elements and, on an overall basis, for the entire ATM switch. In addition, since synchronization essentially needs to occur only from one switching element to the next but not on an end-to-end basis throughout the entire switch, synchronization is substantially easier to implement in my inventive recursively grouped distributed switch than in packet switches known in the art. Also, since identical switching elements are used throughout the entire switch and the interconnections among these elements are highly regular both horizontally and vertically from one such element to the next, the switching elements can be integrated at a relatively high density on a single integrated circuit.

Advantageously, a recursively grouped distributed packet switch of nearly any size can be readily fabricated by appropriately scaling the sizes of the grouping networks accordingly, in terms of the number of the groups of shared output lines produced by each network in any one stage, the number of shared output lines in each of these groups and the number of successive stages that are to be used. In accordance with my teachings, the number of output lines served by all such networks would be chosen to provide an acceptably low cell loss probability within each network.

In accordance with a feature of my invention, a bufferless statistical multiplexor can be readily fabricated through use of a grouping network that is sized in a manner consistent with my inventive teachings.

BRIEF DESCRIPTION OF THE DRAWINGS

The teachings of the present invention can be readily understood by considering the following detailed description in conjunction with the accompanying drawings, in which:

FIG. 4 is a high level flowchart of Routing Header Prepending and VCI Translation Routine 400 undertaken by processor 360 in header processing unit $310_1$ shown in FIG. 3B;

FIGS. 13A and 13B, when arranged as indicated by FIG. 13 are block diagrams of illustrative contention units $1270_{1,1}$, $1270_{2,1}$ and $1270_{3,1}$ and their interconnections shown in FIG. 12 and the manner in which illustrative incoming ATM cells are routed through these units;

FIG. 18 shows a block diagram of a second embodiment of an interface module that can be utilized in B-ISDN switch 200 shown in FIG. 2 and specifically such a module implemented using a bufferless statistical multiplexor implemented through a grouping network in accordance with the teachings of my invention.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in implementing nearly any packet switch of essentially any size, regardless of whether that switch is to be used for service in ISDN (Integrated Service Digital Network) or not. Nevertheless, for purposes of illustration and to simplify the ensuing description, the invention will be specifically discussed in the context of a 8192-by-8192 port packet switch particularly suited for switching asynchronous transport mode (ATM) packets which are applied to each input of a broadband ISDN (B-ISDN) switch at a rate of 155.52 Mbit/second (STS-3c rate).

A. Basic ATM cell structure

Broadband ISDN relies on transporting individual packets of digital data through a packet network situated between user terminals. To provide data carriage for a sufficient number of services, including a high definition video channel, a broadband ISDN user is to be provided with an STS-3c bit rate data channel. Such a channel has a total throughput of 155.52 Mbit/second and an effective data throughput, excluding overhead bits, of approximately 150 Mbit/second.

Figure 1:
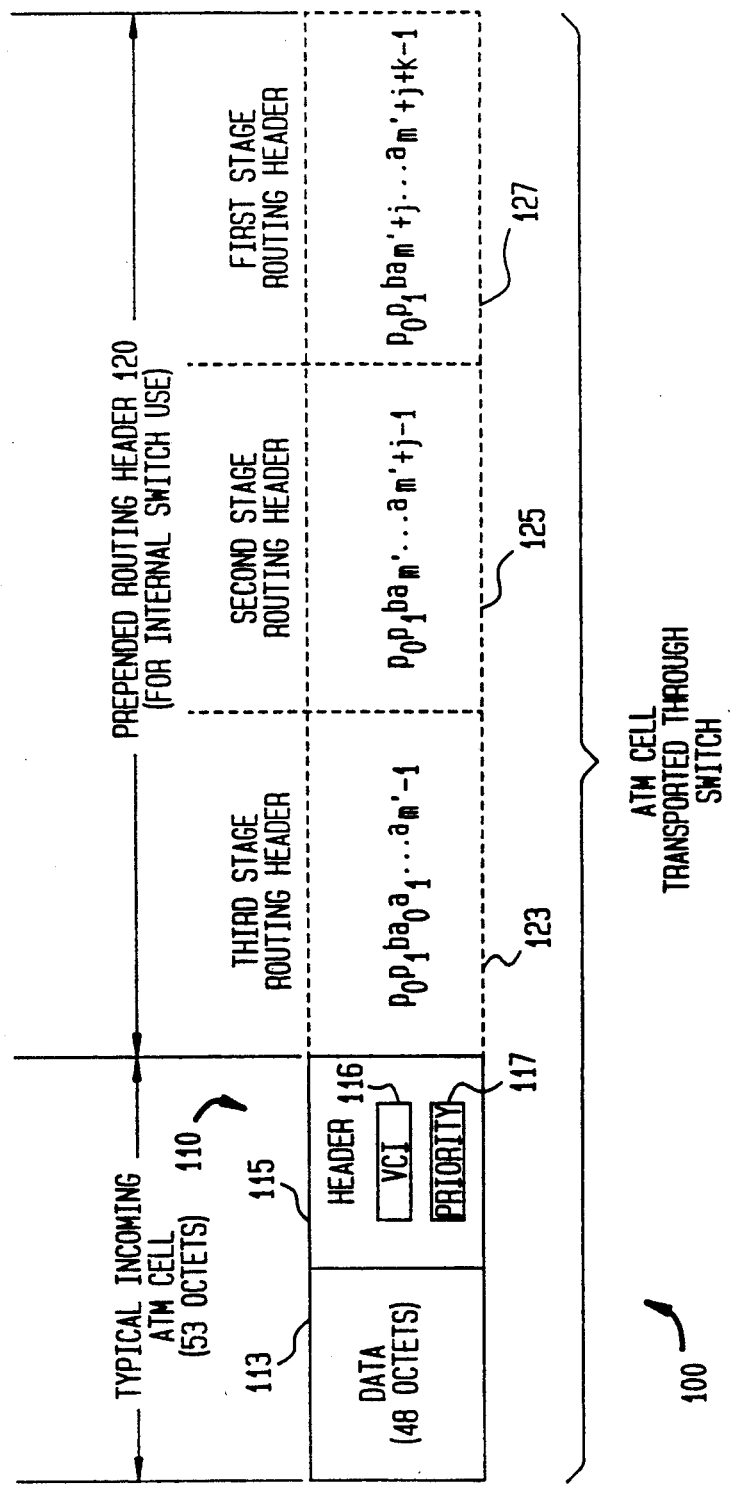
FIG. 1 shows a typical ATM cell, and its constituent fields, as transported through my inventive packet switch.

Each broadband ISDN packet is commonly referred to as a "cell". FIG. 1 shows a typical ATM cell, and its constituent fields, both as supplied by a broadband ISDN terminal and subsequently transported through my inventive packet switch. As shown, incoming ATM cell 110 is typically 53 octets (bytes) long. This cell contains five-octet header 115 followed by all remaining bits (48 octets). Header 115 contains virtual channel identifier (VCI) field 116, single bit priority field 117 and a number of remaining bytes for use with other applications. On an STS-3c line, a 53 byte ATM cell is typically delivered every 2.83 μsec and, excluding the overhead bits, provides an effective capacity of approximately 150 Mbit/second.

The VCI identifies a specific virtual channel, extending between a node within the B-ISDN network to the next successive such node that is to transport the cell. The specific channel and hence its corresponding VCI varies from one node to the next as the cell is transported through successive network nodes. Priority field 117 is embedded within the header 115. The value of the priority field is determined during call set-up negotiations and, as a result, is appropriately set by the user terminal that initially produced cell 110. This field specifies the priority, relative to that associated with other cells, at which the cell is to be transported through the B-ISDN network.

As will be described in much detail below, my inventive switch is self-routing. This means that, prior to that cell being launched into the network, a route for a cell does not need to be extended through the network including all the switches therein. In fact, with self-routing switches, information stored within each cell itself is used to form a route through each switch whenever that cell reaches that switch. In this regard, my inventive switch, in a manner to be described below, translates the VCI of each incoming cell into a new VCI (to identify an output virtual channel from the switch) and prepends a three stage routing header 120 to that cell. The routing header is strictly for internal use in routing the entire cell through my inventive switch. The routing header, indicated by dotted lines, is prepended to each such cell upon entry of that cell into the inventive switch and is subsequently stripped off that cell prior to that cell being transmitted into the output virtual channel. As shown in FIG. 1, routing header 120 contains three fields: first stage routing header 127, second stage routing header 125 and third stage routing header 123. Each routing header is used to route the entire cell through a corresponding one of three separate successive routing stages, as discussed in detail below, that are used in my inventive switch. In addition, each routing header stores a pre-defined bit sequence. This sequence, typified by that situated in header 123, contains a series of address bits ($a_0, a_1, \ldots, a_{m'-1}$) followed by an activity ("busy") bit (b) which, in turn, is followed by two priority bits ($p_0$ and $p_1$). The value of the priority bits are the same for all of the three routing headers and are obtained as a result of translating VCI field 116. The activity bit merely specifies whether the accompanying cell is carrying valid information. Across the three routing headers k, j and m' address bits are respectively used for routing the cell through the first, second and third stages of the switch. Apart from over-writing the VCI field, cell 110 is treated simply as information and provided with bit-serial transport through the switch. The resulting ATM cell including the prepended three stage routing header as transported through my inventive switch is denoted by reference numeral 100.

B. Overall architecture of the inventive B-ISDN switch

Figure 2:
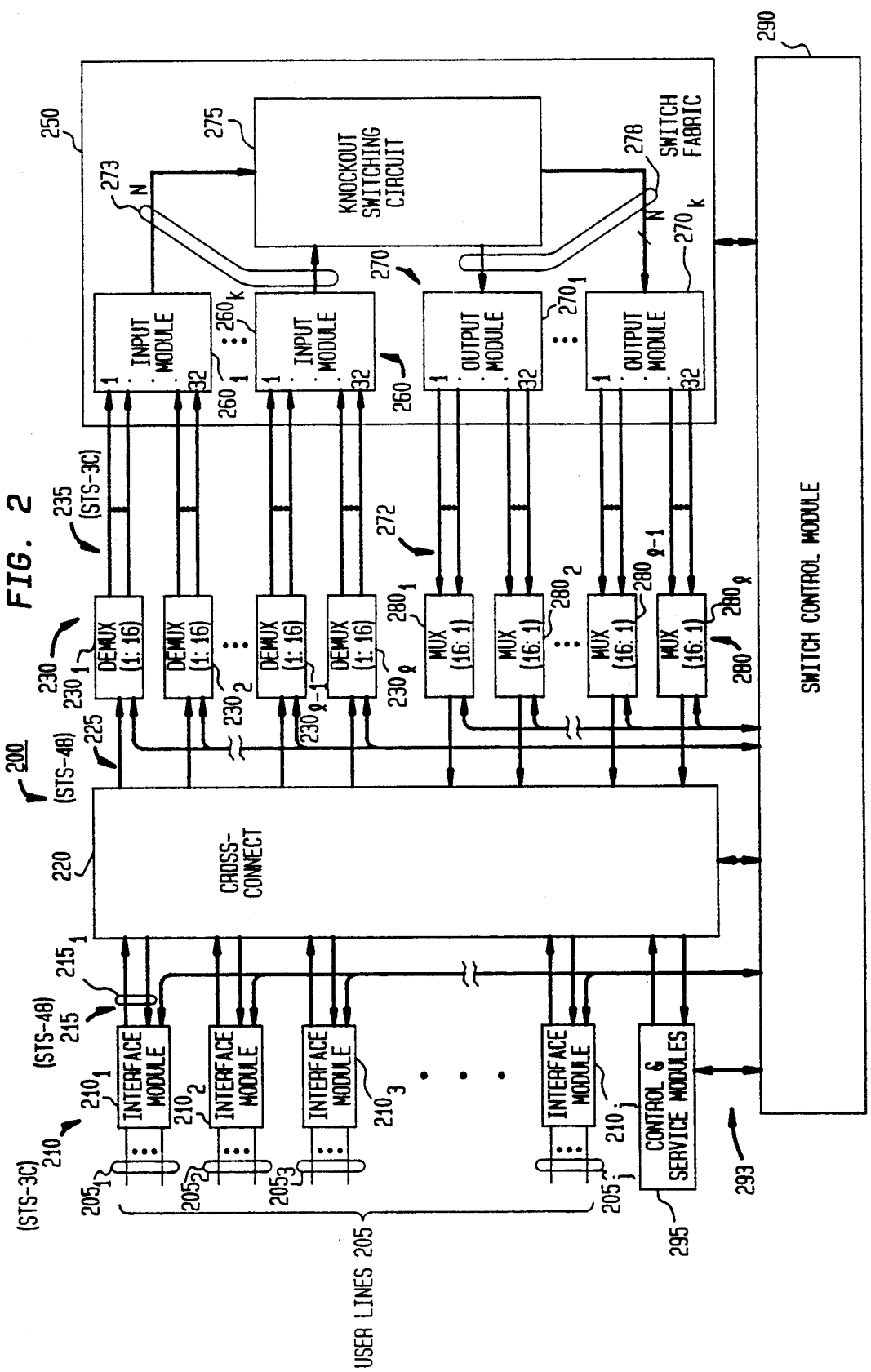
FIG. 2 is a high level block diagram of a broadband ISDN switch.

FIG. 2 is a high level block diagram of a broadband ISDN switch 200. For purposes of simplification, various control and clocking signals and associated circuit blocks that would be readily apparent to those skilled in the art have been intentionally omitted from this and other figures.

As shown, switch 200 is basically formed of interface modules 210, control and service modules 295, cross-connect 220, demultiplexors 230, multiplexors 280, switch fabric 250 and switch control module 290. Interface modules 210 consisting of identical modules $210_1$, $210_2, 210_3, \ldots, 210_j$ interface a number of user lines 205, specifically corresponding line groups $205_1, 205_2, 205_3, \ldots, 205_j$ to switch 200. User terminals (well known and not shown) are connected to the far end of each of these user lines and supply incoming ATM cells in bit-serial fashion thereto and receive outgoing ATM cells therefrom. In essence, each of the interface modules provides a number of essential network functions: it terminates each of its associated data lines, whether emanating from a user or the network; it protects the B-ISDN network both physically (electrically) and in terms of maintaining incoming data in an appropriate form suitable for carriage through the network; it provides a policing function by, for example, limiting the data rate (channel bandwidth) accorded to a user to that which the user has specifically contracted; it concentrates and sorts incoming packets, as needed; and, as discussed in detail below, it performs cell header translation for each incoming ATM cell and prepends a three-stage routing header to each such cell. Through appropriate lines within lines 215, each interface module bi-directionally communicates with the remainder of switch 200 by providing incoming cells at an STS-48 rate (16 times the basic STS-3c rate or approximately 2.5 Gbit/second) and receiving outgoing cells at the same rate. Each of the interface modules is connected to switch control module 290 through leads 293 and is appropriately monitored and controlled thereby. Under the control of switch control module 290, control and service modules 295, provide, also through appropriate lines within lines 215, special purpose inputs and outputs, such as for packet test and switch operations and maintenance connections, into switch 200.

Generally speaking, switch control module 290 performs a number of essential control, test and administration functions for switch 200. To effectively perform these functions, switch control module 290, over leads 293, bi-directionally communicates with and controls each of the blocks that constitutes switch 200 including interface modules 210, cross-connect 220 and switch fabric 250. For example, switch control module 290 processes incoming calls by establishing and tearing down appropriate virtual connections through switch 200 for each such call, selecting routes through cross-connect 220 for incoming and outgoing ATM cells that constitute each call handled by switch 200, determining the specific header translation that is to occur within each interface module and causing each such translation to occur. In addition, the switch control module also performs network maintenance and administrative functions by respectively attempting to locate and repair problems within the network itself and maintaining data on the performance and status of switch 200 and its interactions with the network. Switch control module 290 also distributes traffic between switch 200 and the remainder of the network in order to efficiently use existing network resources. In addition, module 290 also responds to various user inquiries as well as user requests to change service.

Switch control module 290 also performs periodic routine diagnostic tests of the entire switch. In particular, switch control module 290 periodically executes a sequence of diagnostic operations to apply pre-defined ATM test cells to and test the resulting operation, on an end-to-end basis, of the entire switch as well as to test the operation of each of the blocks, as set forth above, within both the switch and the switch fabric. Through these diagnostics, switch control module 290 is able to detect failure conditions and, in the event of such a failure, invoke appropriate corrective action to counteract the failure. Switch control module 290 is formed of any one of many well-known relatively large stored programmed computers and associated peripheral and memory circuits.

Cross-connect 220 is a computer controlled switching matrix that provides circuit switched connected between lines 215, which are connected to interface modules 210 and control and service modules 290, and lines 225. The connections through the cross-connect are established by switch control module 290 and are dynamically changed, as needed, in the event of a failure within switch fabric 250 (such as an input or output module or shared line group) to provide fault tolerant B-ISDN switching operation. High speed trunks, connected through appropriate specialized interface modules would link switch 200 to other switching nodes situated within a B-ISDN network. Since these trunks are irrelevant to the present invention, they have been omitted from the drawing.

Lines 225 apply incoming cells at the STS-48 rate to demultiplexors 230 and accept outgoing cells also at the STS-48 rate from multiplexors 280. Demultiplexors 230, which are formed of identical individual demultiplexors $230_1, 230_2, 230_{1-1}, \ldots, 230_l$, demultiplex the cells, on a time division basis, occurring at the STS-48 rate and appearing on single incoming lines within lines 225, on a 1-to-16 basis, into separate bit-serial lines 235 at the STS-3c rate. Similarly, outgoing cells provided by switch fabric 250 over leads 272 at an STS-3c rate are multiplexed, on a 16-to-1 time division basis, into single STS-48 outgoing trunks situated within lines 225 by multiplexors 280 formed by identical individual multiplexors $280_1, 280_2, 280_{1-1}$ and $280_l$. Each of the demultiplexors 230 and multiplexors 280 is connected to switch control module 290 through leads 293 and is appropriately monitored and controlled thereby.

Incoming STS-3c lines 235 are connected to identical input modules 260 located within the switch fabric and specifically to corresponding input modules $260_1, \ldots, 260_k$. Switch fabric 250 also contains output modules 270 and knockout switching circuit 275, as discussed in detail below. The input modules provide groups of simultaneously occurring incoming cells, over "N" input lines 273, to self-routing knockout circuit 275 for simultaneous routing therethrough.

Outgoing cells conducted through switching circuit 275, via "N" output lines 278, are directed to output modules 270 which are themselves formed of identical individual output modules $270_1, 270_2, \ldots, 270_k$. Each of output modules directs each of the outgoing cells received by that module, but without the accompanying three stage routing header, to one of 32 appropriate output ports on that module. Each of these ports is connected via outgoing STS-3c trunks within lines 272 to multiplexors 280 and therethrough to cross-connect 220 back to either a user line or a high speed link to another network switch. Since the circuitry used in either the input and output modules is readily apparent to those skilled in the art and is not relevant to the present invention, these modules will not be discussed in any further detail.

C. Interface module and header processing unit

As noted above, each interface module performs several essential functions. As it relates to the present invention, each interface module concentrates incoming ATM cells, as needed, and for each such cell performs cell header translation and prepends a three stage routing header thereto.

Figure 3A:
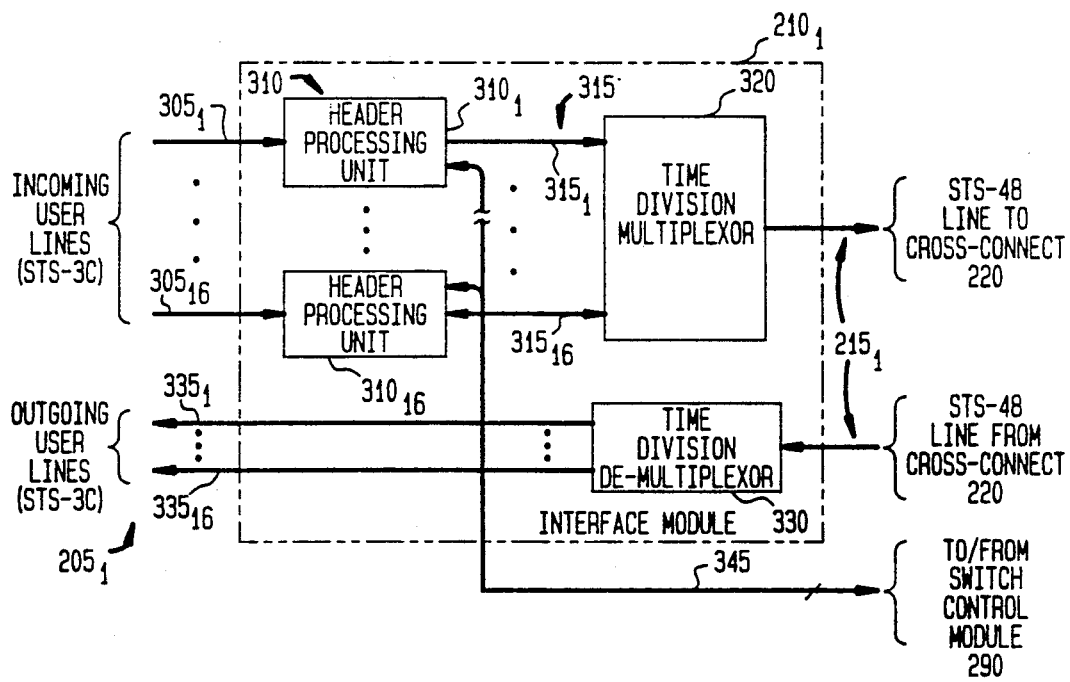
FIG. 3A is a block diagram of a typical interface module, illustratively module $210_1$, shown in FIG. 2.

FIG. 3A is a block diagram of a typical interface module, illustratively module $210_1$, shown in FIG. 2. This module contains header processing units 310, multiplexor 320 and demultiplexor 330. As noted above, each interface module concentrates incoming ATM cells on a 16-to-1 ratio, thereby providing one multiplexed STS-48 line to cross-connect 220 for a group of sixteen successive incoming STS-3c user lines. Similarly, through the demultiplexor, each interface module also demultiplexes one outgoing STS-48 line emanating from cross-connect 220 into sixteen successive outgoing STS-3c user lines. Accordingly, interface module $310_1$ serves incoming user lines $305_1, \ldots, 305_{16}$ and outgoing user lines $335_1, \ldots, 335_{16}$ which collectively form user lines $205_1$. Each incoming user line is connected to a corresponding header processing (HP) unit located within units 310, specifically formed of header processing units $310_1, \ldots, 310_{16}$ respectively associated with lines $305_1, \ldots, 305_{16}$. All of the header processing units are identical. As discussed in detail below in connection with FIG. 3B, each header processing unit translates the current VCI of an incoming ATM cell into a new VCI value for transport to the next successive node in the network, overwrites the current VCI field with the new VCI field and, in conjunction with the value of priority field of the incoming cell, prepends an appropriate three stage routing header to that cell for internal use by switch fabric 250 in routing the cell therethrough. The output provided by header processing units 310 are routed over serial lines 315 formed of individual lines $315_1, \ldots, 315_{16}$ for units $310_1, \ldots, 310_{16}$, to multiplexor 320. This multiplexor concentrates cell traffic across these sixteen lines, on a time division basis, onto one STS-48 line that feeds cross-connect 220. Leads 345 (which form a portion of leads 293 shown in FIG. 2) connect each of the header processing units to switch control module 290 for use in transferring data to the switch control module and receiving control instructions and accompanying data from the control module. The incoming and outgoing STS-48 trunks served by module $210_1$ form trunks $215_1$.

Figure 3B:
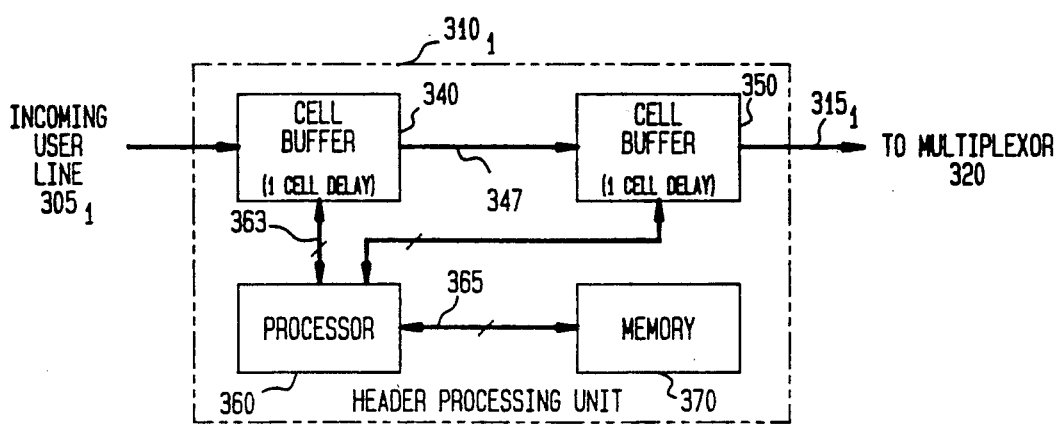
FIG. 3B is a block diagram of a typical header processing unit, illustratively unit $310_1$, shown in FIG. 3A.

FIG. 3B is a block diagram of a typical header processing unit, illustratively unit $310_1$, shown in FIG. 3A. As discussed above, for each incoming ATM cell, this unit translates the current VCI field for that cell into a new VCI, over-writes the current VCI with the new VCI and, in conjunction with the value of the priority field of the incoming cell, prepends an appropriate routing header onto that cell.

As shown, header processing unit $310_1$ is formed of serially connected cell buffers 340 and 350, processor 360 and memory 370. The cell buffers are connected through respective leads 363 and 355 to processor 360 which itself is connected through leads 365 to memory 370. Each of these cell buffers provides a one cell delay. The incoming one cell delay through cell buffer 340 provides processor 360 with sufficient time to perform table look-up operations (as described in detail below in conjunction with FIG. 4) into memory 370, as shown in FIG. 3, to translate the current VCI for an incoming cell and formulate an appropriate three stage routing header for that cell. The bits shifted out of cell buffer 340 are shifted into cell buffer 350 and therethrough onto lead $315_1$. However, immediately prior to the occurrence of any bits being shifted into buffer 350 from buffer 340 for an incoming ATM cell, processor 360 serially applies at the proper bit intervals appropriately valued bits over leads 355 into cell buffer 350 in order to first append the three stage routing header to this cell. Thereafter, as bits for this cell are then shifted into buffer 350, the processor serially applies appropriately valued bits, also via leads 355, to an input of buffer 350 to over-write the VCI field for this cell with a new value. Then, to complete each such cell, all the remaining bits, specifically data bits 113 (see FIG. 1) that form that cell are merely shifted into cell buffer 350, as shown in FIG. 3, in bit-serial fashion over lead 347 from cell buffer 340. The bits shifted out of buffer 350 are applied in bit-serial fashion over lead $351_1$ to an input of multiplexor 320. As such, each header processing unit imparts a two cell delay to each incoming ATM cell. Inasmuch as an STS-3c cell cycle time is approximately 2.83 $\mu$sec, this delay amounts to approximately 5.66 $\mu$sec, which is negligible compared with end-to-end delay.

FIG. 4 is a high level flowchart of Routing Header Prepending and VCI Translation Routine 400 undertaken by processor 360 in header processing unit $310_1$ shown in FIG. 3B. As one can readily appreciate, this processor also executes a number of other routines related to other functions that are performed by the header processing unit. Inasmuch as these functions are essentially irrelevant to the present invention and would all be readily apparent to those skilled in the art, then, for purposes of brevity, they have all been omitted from the following discussion.

Now, specifically with respect to routine 400, execution proceeds to block 410 upon entry into the routine. This block, when executed, reads the value of the current VCI for the incoming ATM cell as that cell is being shifted into cell buffer 340. Once the current VCI field has been completely read, execution proceeds to block 420. This block, when executed, performs a look-up operation into a table stored within memory 370. For each incoming VCI value, this table stores a new VCI value, based upon the interconnection topology of the entire B-ISDN network, and an accompanying routing header. As such, the table look-up operation results in accessing a new VCI value and an accompanying three stage routing header. Should the network interconnection topology change, header processing unit $310_1$ can load appropriate VCI values reflecting the changed topology into the table in response to appropriate instructions and data received over leads 293 (see FIG. 2 and specifically over leads 345 shown in FIG. 3B) from switch control module 290. To provide fault tolerance, a logical three stage routing header can be accessed first, followed by separate logical-to-physical translations (not shown) of each separate routing header through appropriate tables in order to determine a corresponding physical routing address for a corresponding stage of the complete routing header. In the event of a failure condition within switch fabric 250 (see FIG. 2), appropriate changes would then be made in the separate logical-to-physical translation tables to re-route cells through knockout switching circuit 275 in order to bypass failed portion(s) of the fabric, such as in a routing stage, used in my inventive switch. This has the subsequent effect of appropriately changing the corresponding prepended routing header. To assure that no subsequent ATM cells are directed to the failed portion(s), the tables in all the header processing units would be simultaneously changed, typically in response to an instruction broadcast over leads 293 by switch control module 290 to all these modules, in the event of such a failure. By separating the VCI and physical-to-logical translation tables, this advantageously helps to prevent the network data and overall network operation from being inadvertently corrupted in the event of a malfunction occurring in responding to a local failure within the switch fabric as well as to simplify the manner through which that failure condition is handled. To simplify the discussion, I will assume that block 420, as shown in FIG. 4, only produces a physical three stage routing header and that logical routing headers are not used.

After block 420 has been executed to access a three stage routing header, execution proceeds to block 430. This latter block serially applies the three stage routing header into cell buffer 350 at the proper bit times to prepend that routing header onto the head of the incoming ATM cell which is being shifted therein. Thereafter, execution passes to block 440. This block, when executed, shifts the remainder of the incoming ATM cell, in bit-serial form, from cell buffer 340 into cell buffer 350 and therethrough onto lead $315_1$ but, in the process of doing so, over-writes the VCI field with the newly accessed value thereof. The value of the priority field in the prepended three stage routing header is obtained through translation of the VCI field in conjunction with the value of the incoming ATM cell priority field. Once block 440 has fully executed, then execution loops back, via path 450, to block 410 to process the next incoming ATM cell that is being serially applied to header processing unit $310_1$ and so on for subsequent such cells.

D. Knockout Switching Circuit 275

For various reasons, the art appears to favor crossbar switch architectures for use in implementing N-by-N packet switching circuits, such as switching circuit 275. Crossbar switches, as do other types of packet switches, suffer from output contention, i.e. two or more packets attempting to simultaneously appear at the same output port. In an effort to resolve this contention, the art teaches that buffers, specifically queues, can be incorporated in one or more locations in the switch to store one (or more) contending packets for an output port while another contending packet is routed through that port. For a crossbar switch, a buffer(s) can be placed at the input ports, at the output ports or within each crosspoint element itself. Use of such a buffer along with associated centralized control circuitry can, depending upon the location of the buffer(s), significantly increase the cost and complexity of the switch. In this regard, buffer placement and size tend to be critical issues in switch design. Increasing the number of buffers generally increases the throughput of the switch, i.e. the load that can be carried before packets are lost, but at the expense of added hardware and associated delay in transporting packets through the switch. The art teaches that, in resolving contention, output port buffering provides the highest switch throughput, assuming uncorrelated packet traffic incoming among the input ports, as compared to the input or crosspoint based buffering and is therefore the favored approach.

Unfortunately, crossbar type switches tend to contain a very substantial number of crosspoint elements and interconnects which, in turn, highly complicates and adds substantial expense to the task of implementing a large scale packet switch from a single crossbar network. Moreover, crossbar switch architectures known in the art frequently rely on using centralized circuitry to control routing and perform contention resolution which disadvantageously add further cost and complexity to such a switch. In this regard, the added complexity of the interconnect wiring between the centralized contention resolution circuit and each individual switching element may rival or even exceed that required within the crossbar matrix itself. As such and principally because of the resulting cost and complexity, the art teaches that a single stage crosspoint matrix should be used only in those instances where the packet switch is relatively small or where a relatively small crosspoint matrix forms a building block of a large multi-stage switch.

1. Conventional knockout packet switch

In an effort to provide a crossbar based architecture that utilizes output buffering, the art has recently proposed the so-called "Knockout" switch. This switch is aimed at reducing the number of interconnections between all the switching elements and a centralized controller and hence some of the cost and complexity associated with implementing a large packet switch from a large crossbar matrix as well as providing increased delay/throughput performance. See, for example, Y. Yeh et al, "The Knockout Switch: A Simple, Modular Architecture for High-Performance Packet Switching", *IEEE Journal on Selected Areas in Communications*, Vol. SAC-5, No. 8, Oct. 1987, pages 1274–1283; and H. Ahmadi et al, "A Survey of Modern High-Performance Switching Techniques", *IEEE Journal on Selected Areas in Communications*, Vol. 7, No. 7, Sep. 1989, pages 1091–1103.

Figure 5:
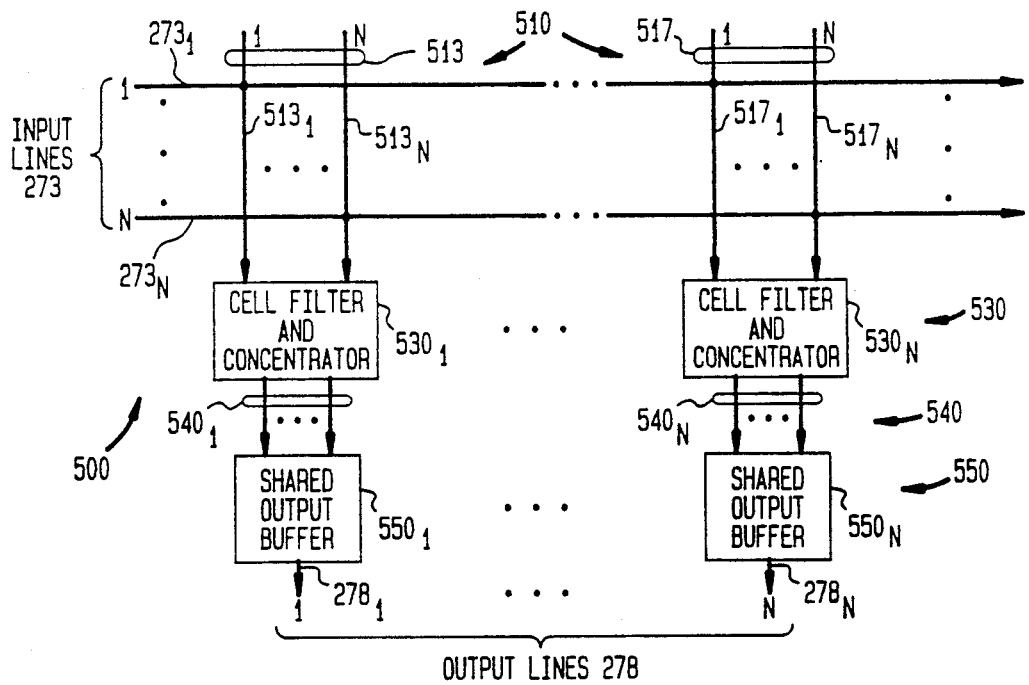
FIG. 5 is a high level block diagram of a typical knockout type packet switch known in the art that can be used in the B-ISDN switch shown in FIG. 2.

FIG. 5 is a high level block diagram of conventional knockout type packet switch 500 known in the art that can be used in the B-ISDN switch shown in FIG. 2. Here, all N input lines 273, collectively formed of lines $273_1, \ldots, 273_N$, are routed, via leads 510, to each cell filter and concentrator $530_1, \ldots, 530_N$ which collectively form cell filters and concentrators 530. Leads 510 contain "N" groups of "N" leads each. Within leads 510, illustrative groups 513 and 517 respectively route all the incoming cells on input lines 273 to cell filter and concentrators $530_1$ and $530_N$. Each cell filter examines the prepended routing header associated with each cell appearing on all "N" leads in its associated group and only permits those cells that have an address that matches the address of an associated output port, e.g. output port $278_1$ for lead group 513, to pass therethrough to the concentrator. In this manner, the cell filters provide a self-routing function Each concentrator then selects L packets from its N incoming lines and applies the resulting cells to a group of L leads within leads 540. Specifically, "L" lead groups $540_1, \ldots, 540_N$, are respectively supplied with cells produced by cell filters and concentrators $530_1, \ldots, 530_N$. The cells appearing at the output of each of the "N" cell filter and concentrators $530_1, \ldots, 530_N$, are respectively applied to the inputs of shared output buffers $550_1, \ldots, 550_N$ which collectively form shared output buffers 550. The "L" cells are stored in their order of arrival in each shared output buffer. Each shared output buffer contains a single queue (not specifically shown). Stored cells are then shifted out of each shared output buffer in seriatim and applied to an output port of the switch. If more than "L" cells are simultaneously routed to the cell filters, the concentrator simply drops out, i.e. knocks out, all the excess cells therefrom. In this regard, shared output buffers $550_1, \ldots, 550_N$ apply cells to outputs $278_1, \ldots, 278_N$ which collectively form output lines 278.

Owing to the error detection and correction capabilities (including packet re-transmission) inherent in a packet, particularly ATM, network, a relatively small amount of packet loss can be readily tolerated. Because of the natural randomness of arriving cells, the art has specifically observed that the probability that more than "L" cells will simultaneously occur (and hence that cells will be dropped) at any output port in one ATM cell time interval is given by equation (1) below:

$$P(\text{cell loss}) = \left[1 - \frac{L}{\rho}\right]\left[1 - \sum_{k=0}^{L} \frac{\rho^k e^{-\rho}}{k!}\right] + \frac{\rho^L e^{-\rho}}{L!} \quad (1)$$

Now, if the value of "L" is sufficiently high, the cell loss probability is very low. For example, if the value of "L" is set to twelve with an offered load at each input port of 0.9, and assuming uncorrelated packet traffic occurs among the input ports with uniform packet distribution by the concentrator as is implicit in equation (1), then the probability that more than 12 ATM cells will be destined to at any one output port, such as output port $278_1$, during a single ATM cell time interval becomes, as given by equation (1), approximately $10^{-10}$. Inasmuch as the expected cell loss of an optical fiber link and associated opto-electronic interface circuitry is expected to be on the order of $10^{-9}$, the cell loss inherent in the knockout switch is acceptable and can be readily compensated by appropriate re-transmission of "knocked out" cells for non-real time services. Since cell knockout and concentration of remaining cells effectively resolve contention within any one output port, a knockout based switch does not need a centralized circuit to resolve contention. Moreover, since all the bus interfaces in such a switch collectively implement a self-routing function, a centralized circuit to control routing is not needed either. While the elimination of these centralized control circuits significantly reduces the interconnect wiring by eradicating the wiring heretofore required by these circuits, a substantial number of interconnects still remains. In this regard, as discussed above, each of the cell filter and concentrators 530 is connected to each of the input lines. Hence, for an "N" line switch, $N^2$ separate interconnections are required.

For a large switch, such as one having upwards of 8000 inputs, as in a typical 1 Terabit/second ATM switch, such a substantial number of interconnections is disadvantageously quite complex and costly to implement.

2. Distributed knockout switch

Hence, in accordance with the teachings of my present invention, I have modified the prior art architecture shown in FIG. 5 in order to reduce the number of required interconnections. In essence, my modification entails inserting crosspoint switching elements into the architecture of FIG. 5 and incorporating a cell filtering function into each of these elements. Doing so advantageously eliminates the need to utilize "N" separate cell filters and associated interconnection wiring. In addition, in view of the cell loss probability, the required number of interconnections from the input lines to each output buffer can be advantageously reduced from "N" lines to only "L" lines, where $L << N$. To attain a cell loss probability on the order of $10^{-10}$, the value of "L" can be approximately two to three orders of magnitude less than the value of "N". Consequently, this provides a substantial reduction in the number of interconnections within the crossbar switching matrix. To distinguish my inventive switch architecture from the prior art which utilizes centralized cell filtering, I shall hereinafter refer to my inventive architecture as the "distributed knockout switch".

Figure 6:
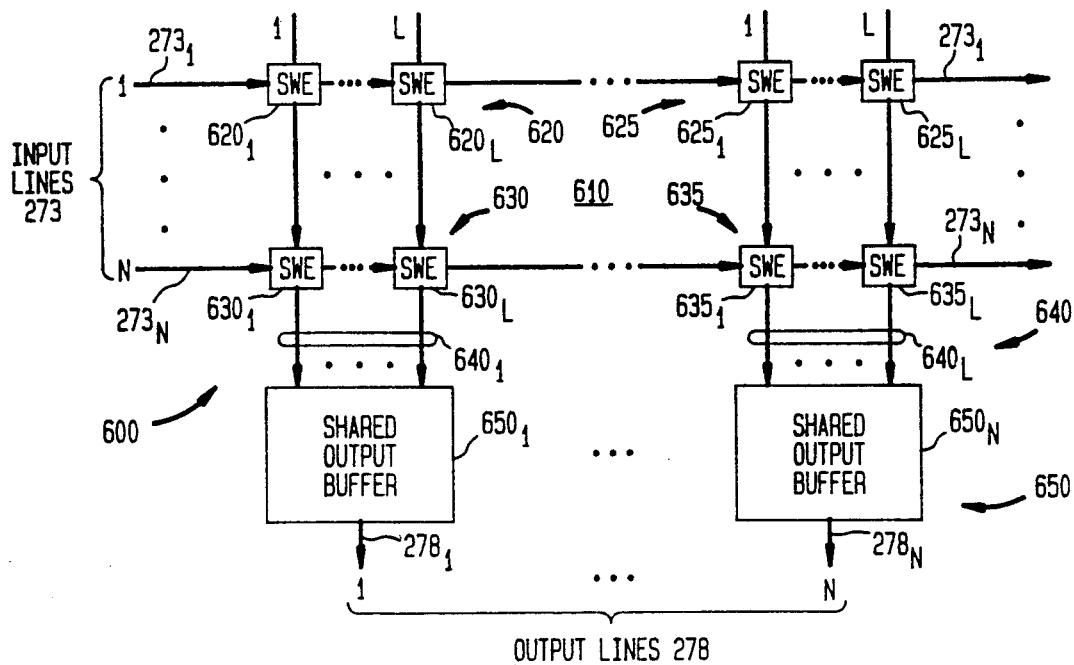
FIG. 6 is a high level block diagram of my inventive distributed knockout switch that can be used in the B-ISDN switch shown in FIG. 2.

FIG. 6 is a high level block diagram of my inventive distributed knockout switch 600 that can be used in the B-ISDN switch shown in FIG. 2. As shown, switch 600 contains a crossbar matrix 610 formed of identical individual switching elements (SWEs). Each of the "N" input lines 273 is connected to "L" switching elements which, in turn, is connected in parallel to "L" inputs of each shared output buffer. Each such buffer provides a corresponding one of the "N" switch outputs. Specifically, input lines $273_1$ and $273_N$ are respectively connected to switching elements 620 containing elements $620_1, \ldots, 620_L$ and elements 630 containing elements $630_1, \ldots, 630_L$. Within elements 620 and 630, each column of "N" vertically aligned switching elements is connected, via a respective lead within leads $640_1$, to one of the "L" inputs of shared output buffer $650_1$. Similarly, input lines $273_1$ and $273_N$ are also connected to switching elements 625 containing elements $625_1, \ldots, 625_L$ and elements 635 containing elements $635_1, \ldots, 635_L$. Within elements 625 and 635, each column of "N" vertically aligned switching elements is connected, via a respective lead within leads $640_L$, to one of the "L" inputs of shared output buffer $650_N$. Thus, my inventive architecture shares "L" routing links among any one output buffer. Shared output buffers 650 which are collectively formed of output buffers $650_1, \ldots, 650_N$ provide respective output lines 278 formed of lines $278_1, \ldots, 278_N$.

While my inventive distributed knockout switch substantially reduces the number of interconnects between the N input lines and the output buffers to $L \times N$ rather than $N^2$, it nevertheless still requires a substantial number of switching elements, i.e. $L \times N^2$. In this regard, if L is set to the value 12, to provide an acceptably low cell loss probability on the order of $10^{-10}$ then my inventive switch would require $12N^2$ switching elements. A switching element, due to economies achievable through circuit integration, is likely to be much less expensive than an wired interconnect. Moreover, due to the uniformity and regularity with which these elements are interconnected, a high level of circuit integration can be achieved to further reduce the cost of all these elements. Nevertheless, for a switch with large N, such as upwards of 6000-8000 inputs for a 1 Terabit/second ATM switch, the number of such switching elements that would be required in such a switch is still exceedingly large.

3. Recursively grouped distributed knockout switch

Accordingly, I have extended the teachings of my distributed knockout switch to result in an inventive switch architecture, hereinafter referred to as a "recursively grouped distributed knockout switch", that not only substantially reduces the number of wiring interconnects associated within a crossbar matrix contained in a knockout type switch by two to three orders of magnitude but also advantageously and significantly reduces the number of individual switching elements that heretofore would be required in my distributed knockout switch by approximately one order of magnitude.

My recursively grouped distributed knockout switch utilizes a succession of routing stages and extends the principle of sharing, as used within the switching matrix itself in my distributed knockout switch, to encompass output sharing between successive routing stages. Instead of just providing only one output line for each group of "L" shared vertical interconnection lines (links) as occurs in my distributed knockout switch shown in FIG. 6, my recursively grouped distributed knockout switch also shares a group of "M" separate output lines among a group of shared interconnection lines from each routing stage and then applies routing link and output sharing on a recursive basis within the crossbar matrix.

Figure 7:
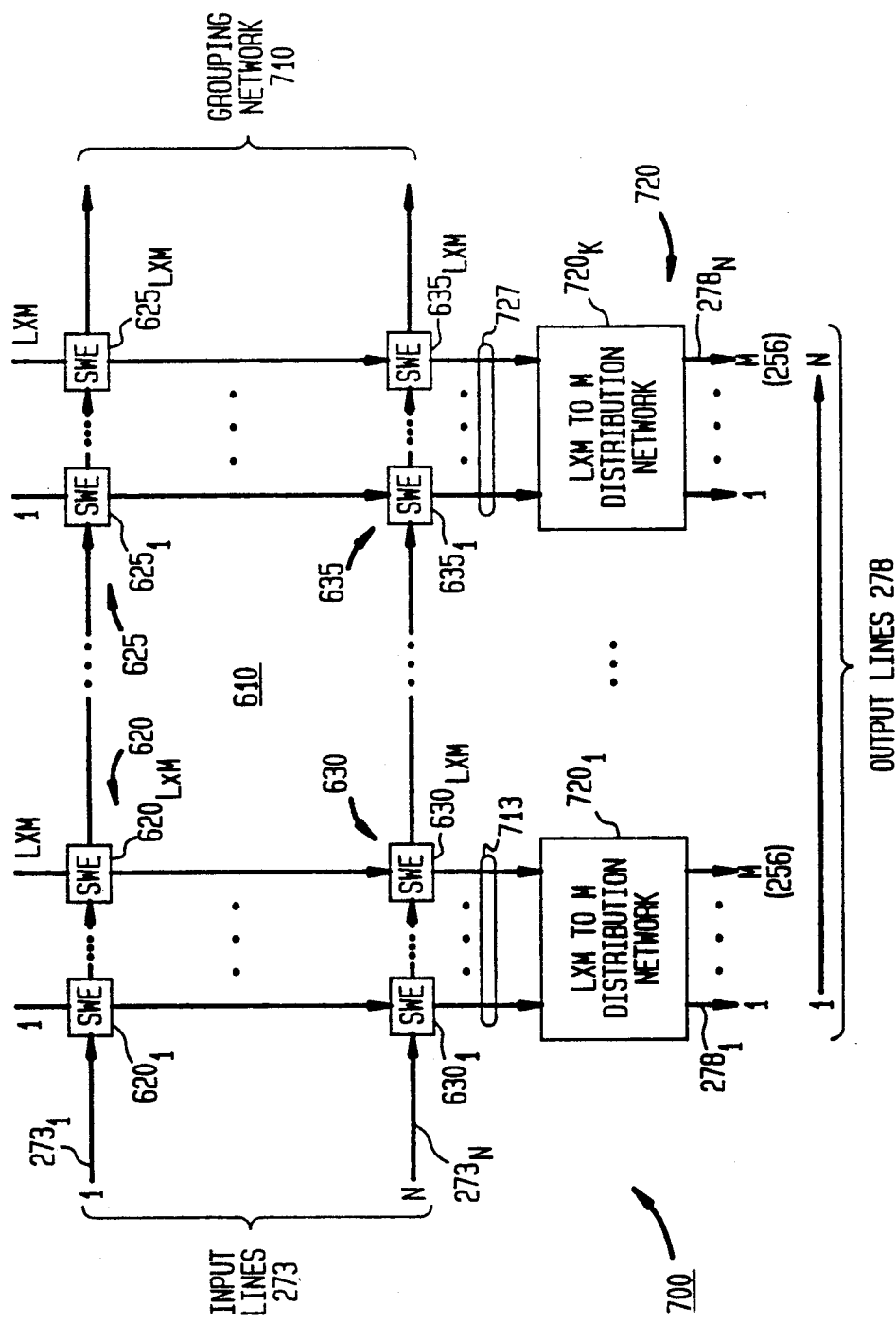
FIG. 7 is a high level block diagram of my inventive distributed knockout switch shown in FIG. 6 but implemented with a grouping network and routing link sharing.

To fully understand my inventive recursive shared packet switch architecture, first consider the switch architecture shown in FIG. 7. Here, as a first step, sharing has been extended to encompass the routing links.

Specifically, FIG. 7 shows a high level block diagram of my inventive distributed knockout switch shown in FIG. 6 but implemented with grouping network 710 and routing link sharing. As shown, all "N" inputs are connected through a group of $L \times M$ links to a group of "M" separate output lines. Specifically, all N input lines 273, formed of input lines $273_1, \ldots, 273_N$, are connected through switching elements and shared group of links, $L \times M$ in number, illustratively shared links 713 connecting switching elements $620_1, \ldots, 620_{L \times M}$ and $630_1, \ldots, 630_{L \times M}$ and shared links 727 connecting switching elements $625_1, \ldots, 625_{L \times M}$ and $635_1, \ldots, 635_{L \times M}$, to a corresponding $L \times M$ to M distribution network, illustratively networks $720_1$ and $720_K$ situated within networks 720. Each group of output lines provided by each distribution network is treated as having a common destination address by the switching elements. Cells which have such an address in their prepended routing header that matches the address of the output lines are merely routed to one of the $L \times M$ shared links associated therewith. Each $L \times M$ to M distribution network merely distributes the incoming cells appearing on a corresponding group of shared routing links to "M" separate output lines (ports). "K" (where $K = N/M$) separate groups of $L \times M$ shared links and associated distribution networks exist in switch 700. All switching elements 610 and the interconnecting routing links implement a grouping network which groups the N input lines into K separate groups of $L \times M$ lines. As will soon become readily apparent, by appropriately increasing the number of shared output lines that are shared within any group, i.e. the value of M (group size), the number of shared links (L) associated therewith can be substantially reduced while still achieving an acceptable cell loss probability.

Now, if the ATM packet switch were to be implemented with only one level of routing link sharing as is depicted in FIG. 7, then the number of separate switching elements would still be quite large, specifically $L \times N^2$. As will shortly be seen, this number can be reduced considerably, by implementing grouping network 710 from a succession of serially connected routing stages that uses routing link sharing and output sharing between successive stages on a recursive basis and through appropriate selection of the "L" and "M" values for each such stage. Of course, the last routing stage in my inventive switch does not use link sharing but rather has only one uniquely addressed output line therefrom to form a corresponding switch output port. Advantageously, if the values of "L" and "M" are appropriately selected for each stage, then the number of switching elements used in my inventive ATM packet switch, as discussed in detail below, can be substantially reduced from $12N^2$, as would be required in my distributed knockout switch, to approximately $1.42N^2$ as would be required in my recursively grouped distributed knockout switch.

With this discussion in mind, equation (1) can be readily modified, to yield equation (2) below, to specify the cell loss probability for a group of $L \times M$ cells that would occur during a single ATM cell time interval, i.e. the probability that more than $L \times M$ cells will be dropped during any such interval.

$$P(\text{cell loss}) = \left[1 - \frac{L}{\rho}\right]\left[1 - \sum_{k=0}^{LM} \frac{(\rho M)^k e^{-\rho M}}{k!}\right] + \frac{(\rho M)^{LM} e^{-\rho M}}{(LM)!} \quad (2)$$

where: $\rho$ is the offered input load factor.

Figure 8:
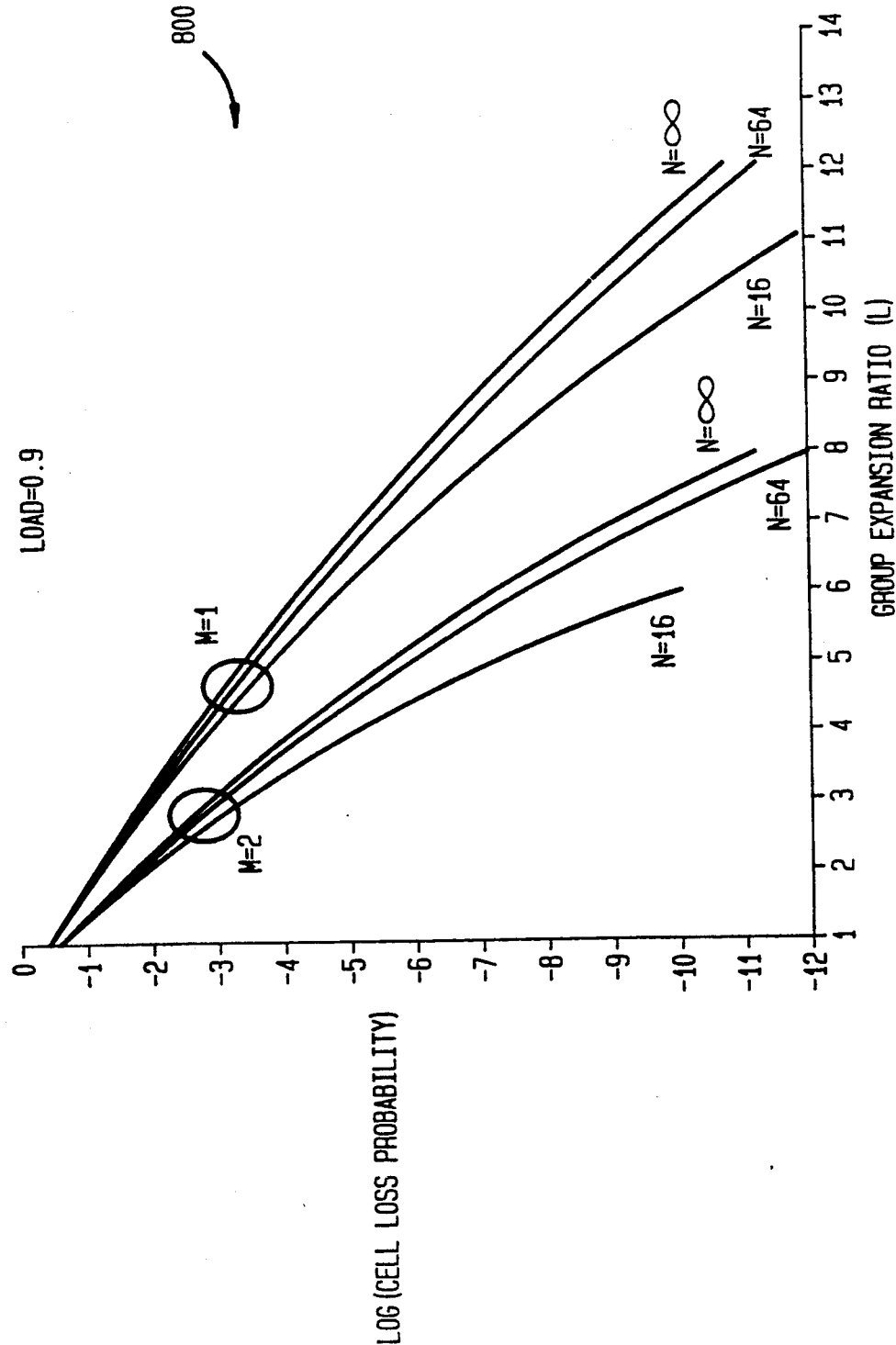
FIG. 8 shows various curves that collectively depict cell loss probability, at an offered load of 0.9, for various values of group size (M) and group expansion ratio (L)
Figure 9:
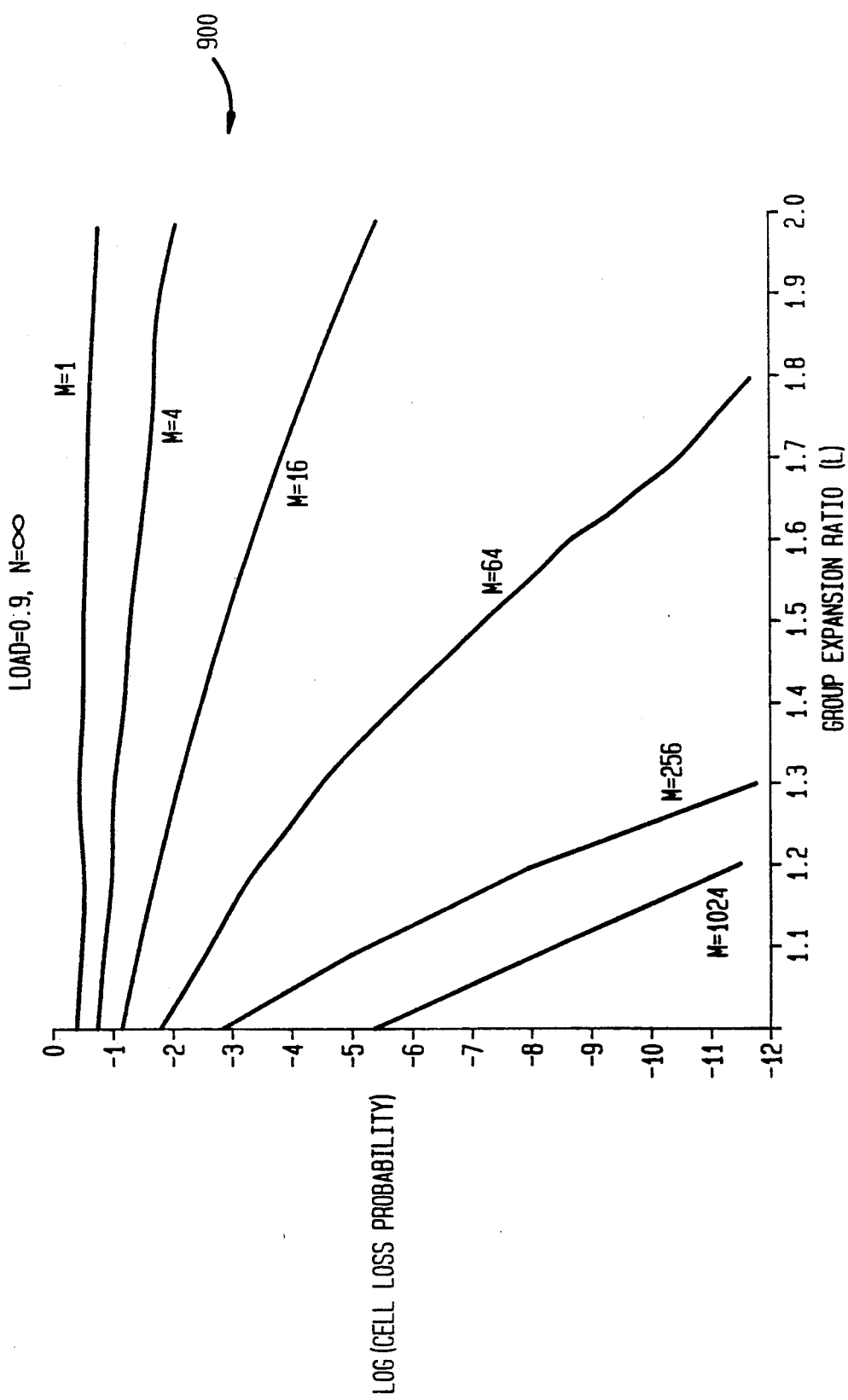
FIG. 9 shows various curves that collectively depict cell loss probability for an infinite number of input lines (N) and various values of group size (M) and group expansion ratio (L), again at an offered load of 0.9.
Figure 10:
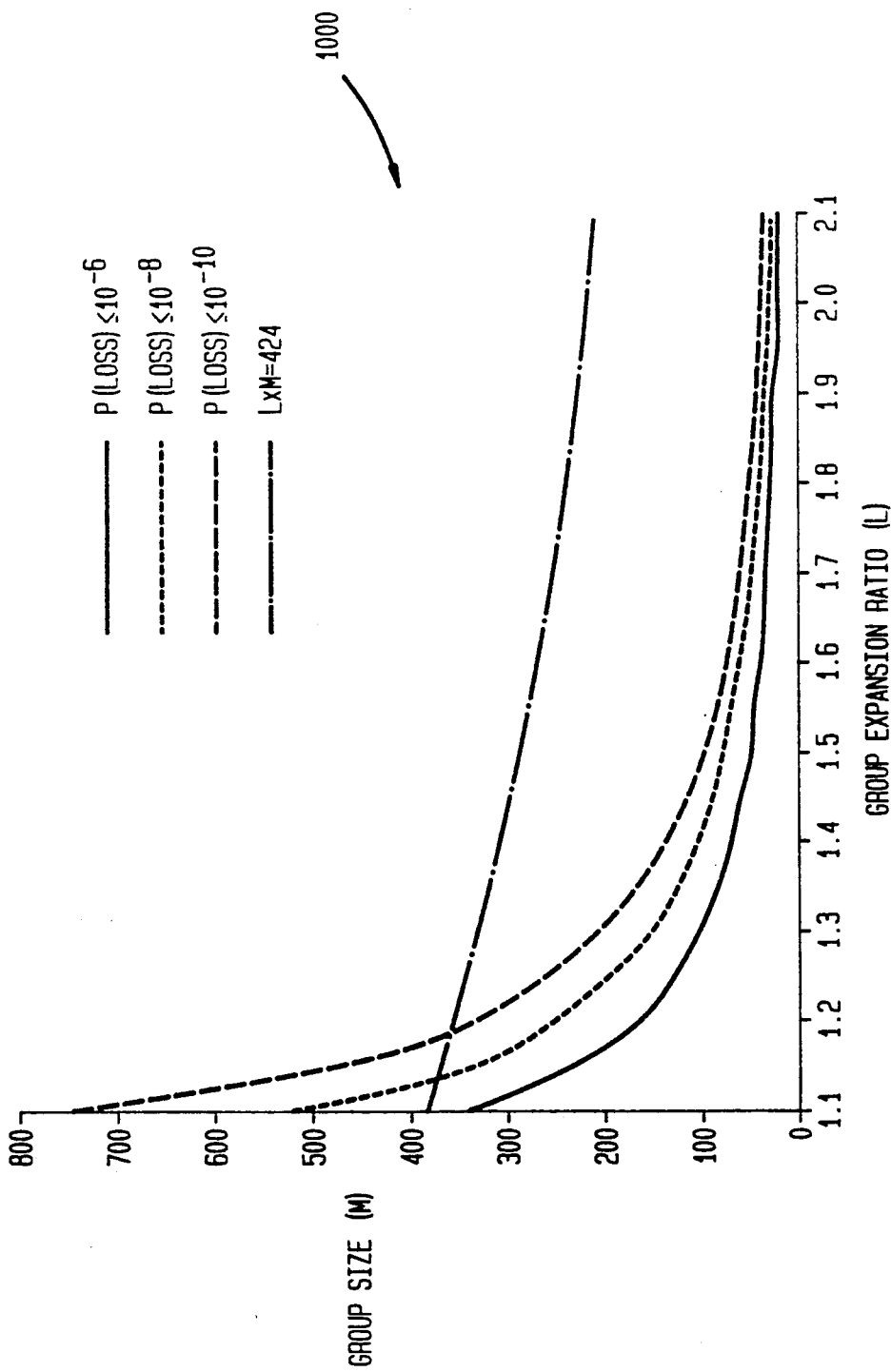
FIG. 10 shows various curves that collectively depict values of group expansion ratio (L) and group size (M) for three different cell loss probabilities as well as the limiting product of L and M, again at an offered load of 0.9.

The results of this equation for an offered input load factor of 0.9 (where the maximum offered input load is taken as the value 1) are collectively shown in graphical form in FIGS. 8-10. For purposes of these figures and the rest of the description, the value "L" will be the group expansion ratio which is defined as the ratio of the number of required vertical interconnection lines (shared links) to the number of output lines in each group. In particular, FIG. 8 depicts through curves 800 cell loss probability for various values of group size (M) and group expansion ratio (L). As shown, as the number of input lines in each group exceeds the value 64, the cell loss probability reaches an asymptotic value of $10^{-12}$. Furthermore, for a given cell loss probability, such as illustratively $10^{-10}$, the required "L" value decreases as the group size (M) increases from illustratively one to two. With this in mind, FIG. 9 depicts through curves 900 cell loss probability for an infinite number of input lines (N) and various values of group size (M) and group expansion ratio (L). It is clearly evident from FIG. 9 that, for a given cell loss probability, the value of "L" decreases as an increasing number of output lines are grouped. For example, given a cell loss probability of $10^{-10}$, the value of "L" decreases to approximately 1.25 if a group size of 256 is used, i.e. if the number of grouped output lines in each group equals 256. Thus, as is now plainly evident, output line grouping allows the number of shared routing links to be reduced considerably. FIG. 10 depicts, through curves 1000, values of the group expansion ratio (L) and group size (M) for three different cell loss probabilities as well as the limiting product of "L" and "M". Interestingly, as the value of "L" increases from 1 to 1.1 for a cell loss probability of $10^{-10}$, then, as shown in FIG. 10, the value of the group size decreases considerably from the value 2750 (not specifically shown) to the value 750.

Since my self-routing switch routes ATM cells to different groups of shared links based on binary address bits prepended to each cell (see FIG. 1 as discussed in detail above), the group size should be preferably be chosen as equalling a power of two, i.e. $2^i$ with i equalling 0, 1, 2, .... Moreover, to reduce implementation complexity and cost by reducing the number of separate switching elements, it is preferable to choose a smaller value for L for a larger group size M. However, every group size is limited to a reasonable size in order to avoid implementational difficulties that might otherwise arise in preserving correct cell sequencing through that group. Furthermore, to maintain correct cell sequencing through each stage of my switch in view of the timing differences—as discussed below—that occur between incoming cells applied to different inputs of that stage, the number of shared links in any group should be less than the number of individual bits in any cell. Inasmuch as the size of an ATM cell is currently proposed in the art to be 53 bytes (including a five octet cell header and a 48 octet field for ensuing data), this results in a bit count of 53 times 8 or 424 bits for each ATM cell. Thus, the values of "L" and "M" should be set for each separate routing stage such that the product of these values does not exceed the value 424. As indicated, in FIG. 10, no difficulties should be presented in doing so as long as the group size in kept within reason. Table 1 below provides a listing of practical values for "L" and "M" for three different cell loss probabilities.

TABLE 1

| | Values of "L" for different cell loss probabilities and group sizes (M) | | | | | | | | |
|---|---|---|---|---|---|---|---|---|---|
| cell loss prob- | Group Size (M) | | | | | | | | |
| ability | 1 | 2 | 4 | 8 | 16 | 32 | 64 | 128 | 256 |
| $10^{-6}$ | 8 | 5.30 | 3.70 | 2.70 | 2.10 | 1.70 | 1.45 | 1.25 | 1.15 |
| $10^{-8}$ | 10 | 6.45 | 4.40 | 3.15 | 2.40 | 1.90 | 1.55 | 1.35 | 1.20 |
| $10^{-10}$ | 12 | 7.50 | 5.05 | 3.60 | 2.65 | 2.00 | 1.70 | 1.45 | 1.25 |

To achieve a cell loss probability of $10^{-10}$ within a routing network, the fewest switching elements would be required if that network is configured with "L" and "M" respectively set equal to the values 1.25 and 256. These values meet the limit set forth above.

With all the principles set forth above in mind, once all "N" output lines have been partitioned into a requisite number of groups, each having $L \times M$ separate output lines, each such group can itself be partitioned into smaller groups in order to further reduce the number of output lines associated therewith by increasing its "L" value. For example, as indicated in Table 1, as the value of "L" increases from 1.25 to 2, the group size decreases from 256 to 32. Accordingly, each such group can itself be recursively partitioned in smaller groups with the group size decreasing at each stage until the group size reaches one. When the group size reaches one, then all the cells are being routed to their proper output ports.

Figure 11:
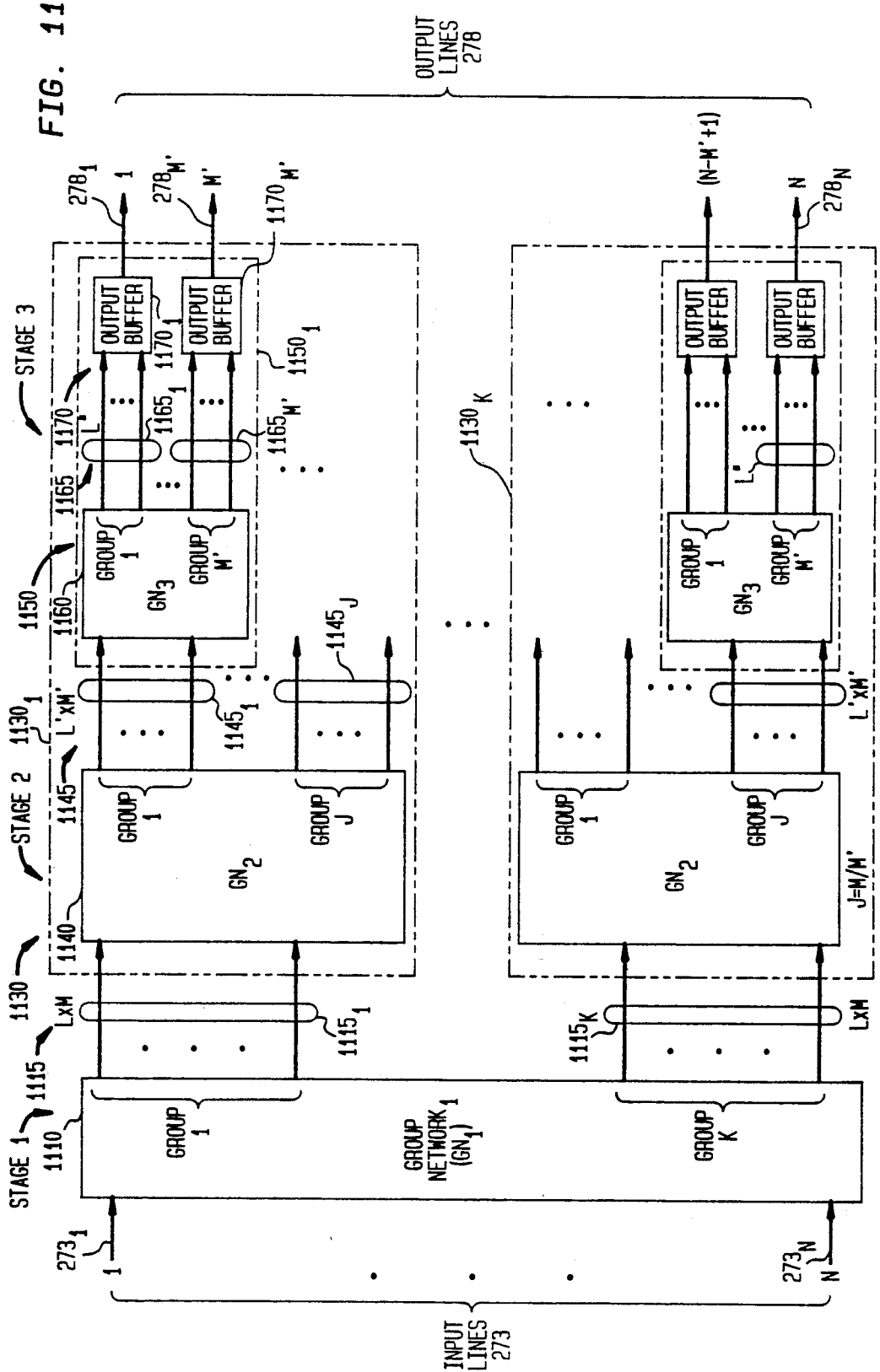
FIG. 11 is a high level block diagram of my inventive recursively grouped distributed knockout switch that can be used in the B-ISDN switch shown in FIG. 2.

Hence, an ATM packet switch constructed in accordance with my inventive teachings, can contain many stages of serially connected recursively constructed grouping networks, with each grouping network providing the requisite number of output line groups and output lines in each group. For purposes of illustration, FIG. 11 shows a high level block diagram of recursively grouped distributed knockout switch that can be used in the B-ISDN switch shown in FIG. 2. This switch has been constructed with only three separate stages of recursive grouping networks. Only three stages are used in order to reduce hardware complexity of the switch as well as to reduce end-to-end cell delay through the entire switch.

As shown, the switch contains three serially connected routing network stages: Stage 1, Stage 2 and Stage 3. Stage 1 contains grouping network (GN) 1100 which receives all "N" input lines 273, specifically containing input lines $273_1, \ldots, 273_N$, and groups these lines into "K" (where K=N/M) separate groups 1115 of L×M shared output lines. Groups 1115 contain individual groups $1115_1, \ldots, 1115_K$ of output lines. Each of these groups is fed into a corresponding grouping network in the second stage. In this regard, illustrative group $1115_1$ feeds second stage grouping network 1140. Grouping network 1140 groups the incoming lines in group 11151 into "J" separate groups 1145 of L'×M', shared output lines, specifically groups $1145_1, \ldots, 1145_J$, where J=M/M'. Each of groups 1145 is, in turn, routed to a separate third stage grouping network 1160 which, in turn, groups the lines in each of the groups 1145 into "M'" separate groups 1165 of L" shared output lines each. Groups 1165 are formed of individual L" groups $1165_1, \ldots, 1165_{M'}$. Each group 1165 of L" output lines is then applied to a corresponding output buffer within buffers 1170. Each output buffer statistically multiplexes the cells appearing on its associated group and stores the multiplexed cells in appropriate internal buffer(s). The buffer(s) is then sequentially read with a serial bit-stream produced thereby being applied to an associated output line of the switch. Specifically, groups $1165_1, \ldots, 1165_M$, are applied to output buffers $1170_1, \ldots, 1170_M$, which, in turn, supply ATM cells in bit-serial fashion on switch output lines $278_1, \ldots, 278_{M'}$. The outputs provided by all the output buffers in the switch drive output lines 278, which contain lines $278_1, \ldots, 278_{M'}, \ldots, 278_N$, of switch 1100. The statistical multiplexing function can be implemented in one of two illustrative ways. One, the incoming cells on each group of L" lines can be written into L" first-in first-out (FIFO) buffers and thereafter read out in round-robin fashion. A barrel shifter needs to be situated in front of theses FIFOs in order to evenly share the FIFOs among the incoming cells to that buffer and also to preserve the ordering of these cells. Alternatively, the statistical multiplexing function can be provided by multiplexing the incoming cells on a time-division basis and storing the resulting multiplexed stream in a single FIFO. This single FIFO would then be read out in a sequential fashion. Unfortunately, the speed of the FIFO in this implementation would of necessity need to be L" times faster than that of each individual FIFO in the first implementation, though the speed requirement could be relaxed somewhat by increasing the word length of the FIFO.

In any event, each third stage grouping network 1160 could be combined with M' output buffers 1170 to form module 1150. This module would be identically replicated "J" times and integrated with second stage grouping network 1140 to form module 1130. Module 1130 would itself be replicated K times, with each such module being connected to a group of output lines from first stage grouping network 1110. Modules 1130 would be replicated as many times as needed given the number of input line groups. This recursive construction advantageously is both a flexible and highly efficient manner to grow the capacity of the entire switch 1100. In addition, modules 1150 could each be replaced with a small-scale packet switch in order to reduce the number of switching elements and interconnection elements that would otherwise be used therein.

The number of switching elements in any such grouping network is equal to the product of its input and output line counts. Table 2 below specifies the total number of switching elements for three stage switch 1100 shown in FIG. 11. Here, the value "K" equals N/M and the value "J" equals M/M'.

TABLE 2

| | Complexity of the grouping networks for the different routing stages in switch 1100 | | |
|---|---|---|---|
| | Stage 1 | Stage 2 | Stage 3 |
| No. of GNs | 1 | K | K × J |
| No. of inputs at each GN | N | L × M | L' × M' |
| No. of outputs at each GN | L × M × K | L' × M' × J | L" × M' |
| No. of SWEs in each GN | N × L × M × K | L × M × L' × M' × J | L' × M' × L" × M' |
| No. of SWEs at each stage | N × L × M × K | K × L × M × L' × M' × J | K × J × L' × M' × L" × M' |

The total number of switching elements in switch 1100 is given by the sum of the three terms in the last row in Table 2, or $L \times N^2 + N \times L \times L' \times M + N \times L' \times L'' \times M'$. Now, if the following values are set: M=256, L=1.25, M'=32, L'=2, and L"=12, then, for a cell loss probability of $10^{-10}$, the total number of switching elements within switch 1100 approximately equals $1.25N^2 + 1408N$. For a switch with 8192 inputs, as would occur in a 1 Terabit/second ATM cell switch with each input line providing a bandwidth of approximately 150 Mbit/second, then the number of switching elements required in my recursively grouped distributed knockout switch can be normalized to approximately $1.42N^2$—which advantageously is on the order of approximately one order of magnitude less than the $12N^2$ switching elements that would be required in my distributed knockout switch.

This discussion will now proceed to describe how a grouping network is implemented and will then describe a preferred embodiment of the circuitry of the switching element used in any such network.

Figure 12:
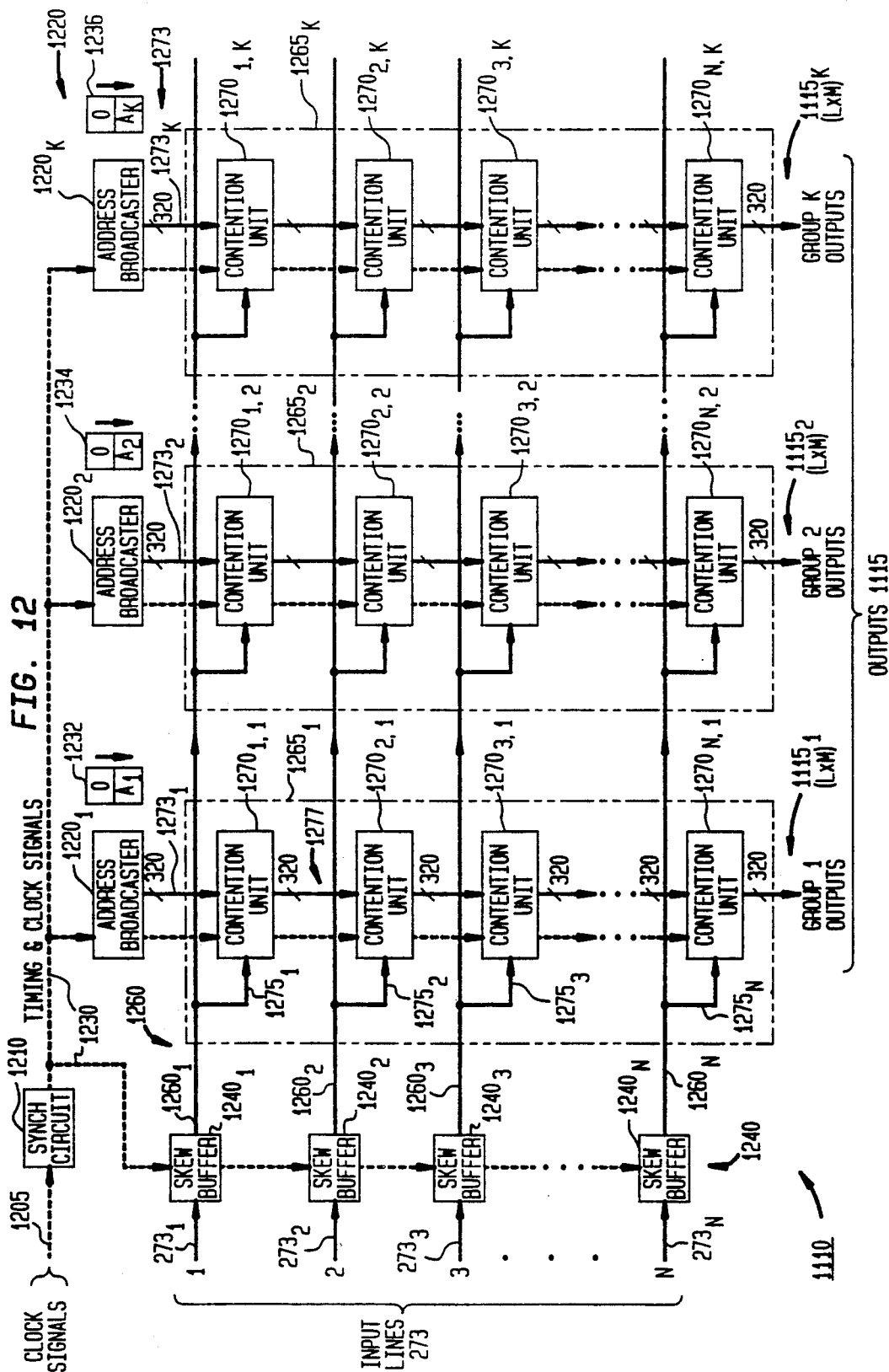
FIG. 12 is a block diagram of grouping network 1110 shown in FIG. 11.

FIG. 12 is a block diagram of illustrative grouping network 1110 shown in FIG. 11. As discussed above, this network groups all "N" input lines to the switch into "K" groups, each having L×M outputs. With N, M and L set equal to the values 8192, 256 and 1.25, respectively, each group contains 320 separate shared outputs. Given these values, network 1110 produces 32 such groups.

As shown, network 1110 is formed of an N by K matrix of identical contention units, specifically units $1270_{1,1}$, $1270_{1,2}$, ..., $1270_{1,K}$, $1270_{2,1}$, $1270_{2,2}$, ..., $1270_{2,K}$, $1270_{3,1}$, $1270_{3,2}$, $1270_{3,3}$, ..., $1270_{3,K}$, ..., $1270_{N,1}$, $1270_{N,2}$, ..., $1270_{N,K}$. All the contention units within each row in the matrix are fed, via leads 1260 specifically containing leads $1260_1$, $1260_2$, $1260_3$, ..., $1260_N$, with ATM cells incoming on a corresponding input line, e.g. respective input lines $273_1$, $273_2$, $273_3$, ..., $273_N$. Each column of contention units, specifically columns $1265_1$, $1265_2$, ..., $1265_K$, is fed, on a daisy-chained basis, with common address and priority bits that are generated by an associated address broadcaster, specifically respective broadcasters $1220_1$, $1220_2$, ..., $1220_K$. A column of contention units, such as column $1265_1$, and its associated address broadcaster route ATM cells to a corresponding group of L×M shared output lines (here illustratively constituting 320 such lines), e.g. lines $1115_1$ within all output lines 1115 that are produced by grouping network 1110.

Each contention unit, given the address and priority bits broadcast thereto—hereinafter collectively referred to as a broadcast cell—and the incoming cells, performs a two level comparison between every incoming ATM cell applied thereto and the broadcast cells it receives. If an address contained within any such incoming cell matches the address broadcast to that contention unit, then that unit routes the incoming cell to one of its shared outputs, with the particular output being determined by the number of contending requests for all these outputs and with high priority incoming cells being given preference for that output over low priority incoming cells. The outputs of this contention unit in any column feed the inputs of the next successive contention unit in that column so as to interconnect all the contention units in that column in a daisy-chained fashion. For example, the 320 outputs of contention unit $1270_{1,1}$ are applied, in parallel, via leads 1277, to 320 respective inputs to contention unit $1270_{2,1}$. The contending requests for outputs, whenever they occur, within each contention unit in any column, such as unit $1270_{2,1}$ in column $1265_1$, are caused by the incoming ATM cells that are applied from a corresponding input line, e.g. line $1260_2$, and ATM cells being simultaneously routed downward from a prior contention unit, such as unit $1270_{1,1}$ in the same column. By virtue of the daisy-chained connections of all N contention units in each column, these units effectively route L×M commonly addressed simultaneously occurring incoming ATM cells on N input lines 273 to the shared output lines for that column, such as to shared output lines $1115_1$ associated with column $1265_1$ for cells addressed to group 1. Any number of incoming cells that exceeds L×M cells are simply dropped off ("knocked out") by the contention units in the column and are not routed onward. Every column of contention units generates a corresponding group of L×M shared output lines. In this regard, contention units $1270_{1,1}$, $1270_{2,1}$, $1270_{3,1}$, ..., $1270_{N,1}$ provide 320 separate shared output lines $1115_1$ which collectively constitute group 1; contention units $1270_{1,2}$, $1270_{2,2}$, $1270_{3,2}$, ..., $1270_{N,2}$ provide 320 separate shared output lines $1115_2$ which collectively constitute group 2, and so on with contention units $1270_{1,K}$, $1270_{2,K}$, $1270_{3,K}$, ..., $1270_{N,K}$ providing 320 separate shared output lines $1115_K$ which collectively constitute group K (32).

Each address broadcaster $1220_1$, $1220_2$, ..., $1220_K$, continually broadcasts the same bit sequence in every cell broadcast to each column of contention units. The sequence contains a specific address of that column, i.e. a specific group of shared output lines, and priority bits that are set to the lowest priority, typically zero. For address broadcasters $1220_1$, $1220_2$, $1220_K$, the broadcast bit sequences for columns $1265_1$, $1265_2$, and $1265_K$ are shown as bits 1232, 1234 and 1236 with addresses $A_1$, $A_2$ and $A_K$ being set to the respective address, 1. 2, ..., K, of the corresponding column (group). These sequences are broadcast into the first contention unit in each column as indicated by an adjacent arrow. The priority bits which follow the address bits in each of these sequences are set to zero.

For the case of N=8192, each broadcast bit sequence contains thirteen address bits followed by three bits: the first of which is an activity or "busy" ("b") bit followed by two priority ("p") bits. To simplify the following discussion, since the busy bit which merely indicates whether the cell is valid or not is processed in the same basic manner as a priority bit, the busy bit will be hereinafter treated as though it were a priority bit. Of the thirteen address bits, only the five most significant bits (in field 127 shown in FIG. 1) are needed to select one of the 32 different groups in grouping network 1110. Of the remaining address bits, the next three address bits (situated in field 125 shown in FIG. 1) are used to select one of eight groups of shared links provided by each of the second grouping networks, e.g. network 1140 shown in FIG. 11, with the remaining five address bits (situated in field 123 shown in FIG. 1) being used to select one of 32 individual outputs provided by each of the third stage routing networks, e.g. network 1160 shown in FIG. 11. While each address broadcaster in every routing network broadcasts a full thirteen bit address to every contention unit in its corresponding column, through appropriate timing signals applied thereto, as described in detail below, that contention unit only compares the address and associated priority bits that are applicable to the specific grouping network to which it belongs and totally ignores all the remaining bits in the prepended routing header of each incoming ATM cell applied thereto. Specifically, each column within grouping network 1110 is uniquely addressed through the first five address bits in the entire prepended routing header. In addition, each one of address broadcasters 1220 delays the timing signals by a bit interval and applies the resulting delayed signals to the first contention unit in its associated column. The occurrence of these timing signals specifies time windows during which each contention unit is to perform bit comparisons of the address and priority fields. One such window exists for comparison of address bits; a successive window exists for comparison of priority bits. These timing signals specifically referred to as "x1" and "x2" below) are appropriately set for each grouping network in order to define the particular timing windows that encompass the proper address and priority bits which are to be compared in the prepended routing headers of the cells propagating through that network. As indicated by dashed lines in FIG. 12, these timing signals are passed in a daisy-chained fashion from one contention unit to the next successive unit within any one group. Each contention unit appropriately delays these timing signals by a bit interval to assure proper phasing of these signals with the incoming address and priority bits that are to be applied to the next successive unit.

In addition, to maintain proper bit timing through the matrix, the incoming ATM cells that appear on each successive line in input lines 273 are delayed by an appropriate number of bit times through skew buffers 1240. Skew buffers $1240_1$, $1240_2$, $1240_3$, ..., $1240_N$, which collectively form skew buffers 1240, provide correspondingly increasing amounts of delay to incoming ATM cells that appear on respective input lines $273_1$, $273_2$, $273_3$, ..., $273_N$. As discussed in detail below in conjunction with FIG. 14, the amount of delay that is provided by each skew buffer increases by one bit time from each input line to the next. This delay matches the propagation delay imparted to the broadcast address and priority bits as they are successively applied from one contention unit in any one column to the next successive unit in the same column and, as such, maintains proper bit alignment between the incoming and broadcast address and priority bits that are applied to each contention unit. Within grouping network 1110, synch (synchronization) circuit 1210 receives appropriate clock signals on leads 1205 and generates timing and clock signals, over leads 1230, that are applied to first skew buffer $1240_1$ and each address broadcaster and, through daisy-chained connections, to every successive skew buffer and each contention unit therein.

Figure 13B:
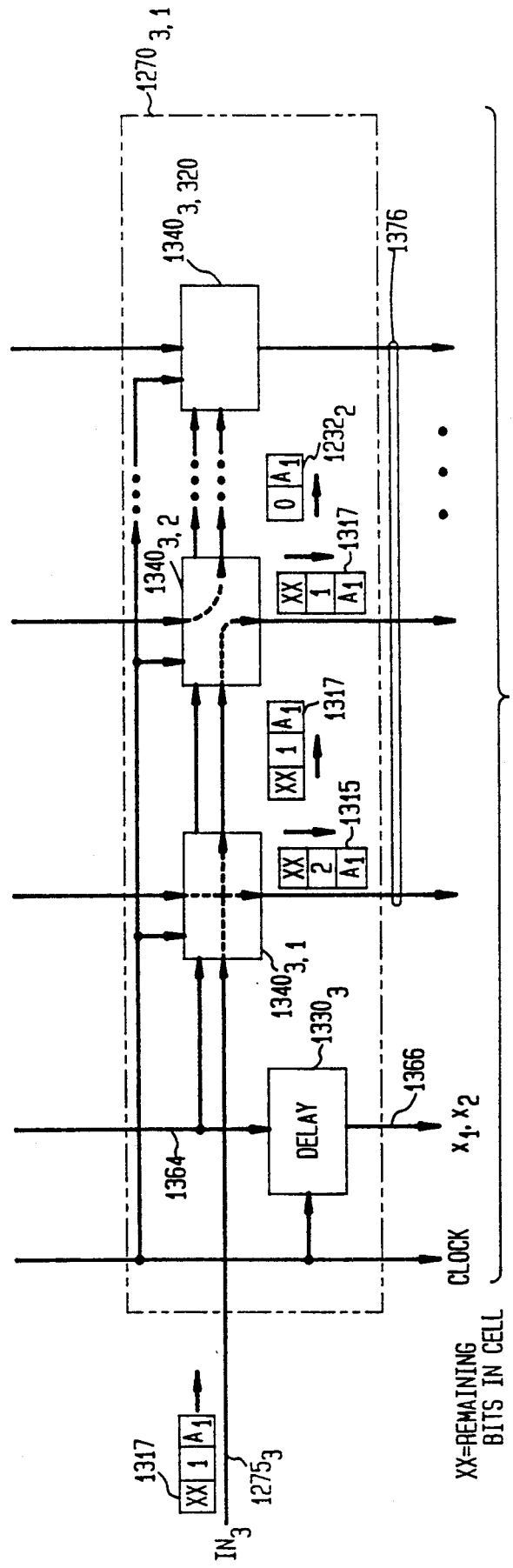

With this overall description of grouping network 1110 in mind, FIG. 13 depicts a block diagram of illustrative contention units $1270_{1,1}$, $1270_{2,1}$ and $1270_{3,1}$ used in this grouping network as well as their interconnections and the manner in which illustrative incoming ATM cells are routed through these units.

As shown, each contention unit is formed of a series of L×M (illustratively 320) separate identical switching circuits and a delay element. For example, contention unit $1270_1$ contains switching elements $1340_{1,1}$, $1340_{1,2}$, ..., $1340_{1,320}$. Similarly, contention units $1270_2$ and $1270_3$ respectively contain switching elements $1340_{2,1}$, $1340_{2,2}$, ..., $1340_{2,320}$ and switching elements $1340_{3,1}$, $1340_{3,2}$, ..., $1340_{3,320}$. Vertically aligned switching elements are serially connected from one contention unit to the next to form columns of "N" switching elements. An address broadcaster feeds identical broadcast cells $1232_1$, $1232_2$, ..., $1232_{320}$ (containing identical address and zero-valued priority bits), via leads $1273_1$, specifically containing leads $1273_1$, $1273_2$, ..., $1273_{320}$, into the first switching element, e.g. element $1340_{1,1}$, in each such column.

Inasmuch as the arrangement and interconnection of the identical switching elements and associated delay elements are highly regular, the physical density of the overall switching fabric can be quite substantial by fabricating rows of interconnected switching elements in modular form using very large scale integrated circuits. These modules would, in turn, be interconnected again on a regular basis to form larger modules that each have successive internal levels of grouping networks, and so on in order to recursively construct the entire switching fabric in a relatively small physical space.

Figure 15:
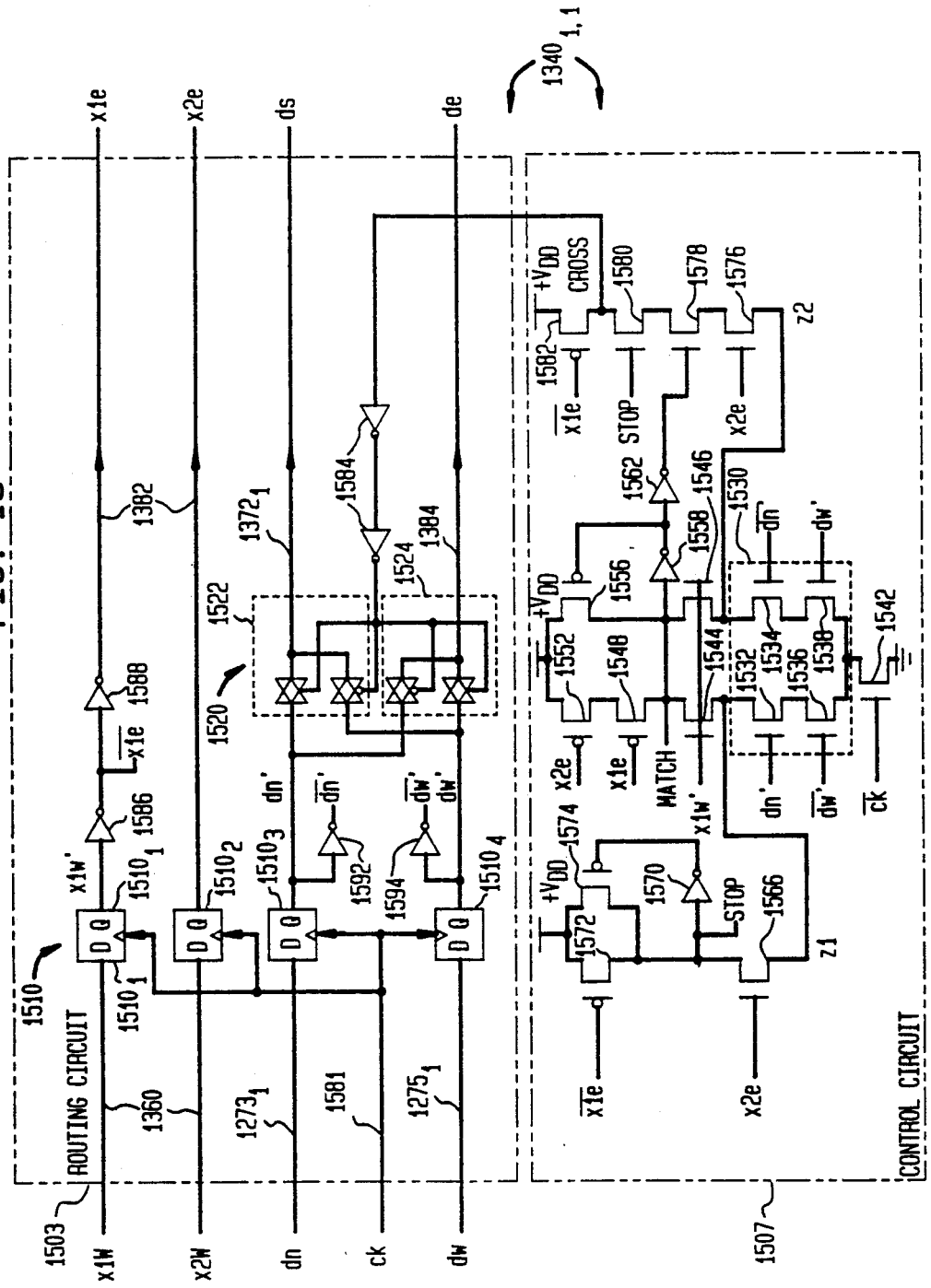
FIG. 15 is a circuit diagram of my inventive switching element, illustratively element $1340_{1,1}$ shown in FIG. 13.

Each switching circuit, which will be described in detail below in conjunction with FIGS. 15 and 16, has two data signal inputs and two data signal outputs. For convenience, these inputs and outputs will be identified by their relative directional location on each element: north, south, east and west. Incoming cells, whether from an associated input line or routed from a prior switching element, as discussed below, are applied on the north and west inputs. For convenience, the incoming bit-serial cells applied to these inputs will hereinafter be referred to as "$d_n$" and "$d_w$", respectively. Outgoing cells, as routed through a switching element, are applied to either the south or east outputs of that element. Also, for convenience, the outgoing bit-serial cells provided by these outputs will be hereinafter referred to as, "$d_s$" or "$d_e$", respectively. A switching element, such as illustrative element $1340_{1,1}$, can exist in one of two states: a crossed or non-crossed state. Whenever a switching element is in a crossed state an incoming cell applied to the west input of that element is routed to the east output and an incoming cell applied to the north input of that element is routed to the south output thereof. The routing paths through various switching elements shown in FIG. 12 ar®depicted by dashed lines. Illustrative cell $1340_{1,1}$ is shown, through lines 1342, as being in the crossed state. Alternatively, whenever a switching element is in a non-crossed state, an incoming ATM cell applied to the west input of that element is routed to the south output and an incoming cell applied to the north input of that element is routed to the east output thereof. Ilustrative cell $1340_{2,1}$ is shown, through lines 1344, as being in the non-crossed state.

Ordinarily, a switching element remains in the crossed state. However, that element will assume the non-crossed state if the incoming cells applied to the north and west inputs satisfy two conditions. First, the addresses of these cells must match. If the cell is an incoming ATM cell, then the address lies in that portion of the stage of the routing header corresponding to the grouping network that contains the switching element. For all the elements shown in FIG. 13, the address is a five bit address field lying in first stage routing header 127 (see FIG. 1). If that cell is a broadcast cell, then the address is the address bits in the broadcast cell that are applicable to the stage of the grouping network. Similarly, for the cells shown in FIG. 13, the appropriate broadcast address bits form the most significant five address bits of each thirteen bit broadcast address. Second, if the addresses of two cells applied to the north and west inputs match, then the cell applied to the west input must have a higher priority value than the cell applied to the north input. This necessary priority difference between the two cells will henceforth, for convenience, be referred to as the "priority condition". Thus, as all the incoming and broadcast cells propagate through the switching elements in a group, then, within any column of contention units that form that group, the address and priority comparisons performed within each switching element therein cause empty cells, which originate from the address broadcasters, followed by low priority incoming ATM cells to be successively pushed to the right from switching element to switching element and from each contention unit to the next by the high priority incoming ATM cells that are applied from the left to that group. By virtue of comparing priority of two input cells within each individual switching element, the entire function of contention resolution is distributed on an elemental basis throughout the switch, rather than being centralized. Inasmuch as this totally eliminates the need to use a central contention resolution device within the switch fabric, the complexity of the fabric is significantly simplified and the interconnects in the switch fabric that might otherwise be used to couple each switching element to a centralized contention device are also eliminated, thereby substantially reducing the total number of interconnects that are needed in the fabric.

As discussed above, each broadcast address shown in FIG. 1 for the three stage switch shown in FIG. 11, contains thirteen separate prepended address bits. However, each switching element only compares one of three addresses contained in three stage prepended address field. Timing signal x1, shown in FIG. 13, is applied to each switching element. This signal defines an appropriate time window in terms of successive bit intervals, during which that element is to compare the address bits of the incoming cells applied to that element. As long as that signal is high, address comparisons can occur on a bit-by-bit basis. When the signal is low, the address bits of these incoming cells are simply ignored by that switching element. Similarly, timing signal x2 is also applied to each switching element. This signal defines an appropriate time window in terms of successive bit intervals, during which that element is to compare the priority bits of the input cells applied to that element. As long as that signal is high, priority comparisons can occur on a bit-by-bit basis. When the signal is low, the priority bits of these input cells are simply ignored by that switching element.

To maintain synchronization, clock signals are simultaneously applied, via leads $1350$, to all the switching elements and the delay elements in a grouping network, which for network $1110$ (see FIG. 12) includes but is not limited to all the elements shown in FIG. 13. Furthermore, to maintain correct bit alignment between the start of the incoming cells applied to each switching element within any contention unit, such as within unit $1270_{1,1}$, and from one contention unit to the next, these timing signals propagate with the cells from one switching element to the next and from one contention unit to the next. In particular, timing signals x1 and x2 are propagated in a daisy-chained fashion from switching element to switching element within any contention unit, with each element imparting a delay of a single bit interval to both of these signals. In addition, these timing signals also propagate in a daisy-chained fashion, via illustrative leads $1360$, $1362$, $1364$ and $1366$, from the address broadcaster, such as broadcaster $1220_1$, to each successive contention unit, e.g. units $1270_{1,1}$, $1270_{2,1}$ and $1270_{3,1}$ through an associated delay element and so on throughout all such units in the associated column. To assure proper bit alignment between these timing signals and the input cells within each successive contention unit, each of these delay elements, specifically $1330_1$, $1330_2$, $1330_3$ for contention units $1270_{1,1}$, $1270_{2,1}$ and $1270_{3,1}$, respectively, imparts a single bit interval delay to both of these timing signals as they propagate from each contention unit to the next. All the delay elements are synchronized by the clock signal. Inasmuch as the lengths of the interconnection wires running from each switching element to the next, both vertically and horizontally, are all short and can be readily kept essentially identical, this provides two advantages. First, uniform interconnects relax the timing alignment that is required between individual switching elements. Second, since each switching element only needs to drive relatively short interconnects, relatively low power output drivers can be used. This advantageously reduces the power consumption of each switching element as well as the heat dissipated thereby. Furthermore, through the use of grouping networks, data and timing signals need to be synchronized only within each grouping network instead of throughout the entire switch fabric, thereby further simplifying internal switch synchronization.

Having now described the circuitry that forms each contention unit and the manner in which successive contention units are interconnected in a grouping network, I will now describe the manner in which illustrative incoming ATM cells are successively routed through the switching elements. For ease of illustration and simplicity, I will provide this discussion in the context of the elements shown in FIG. 13.

As discussed, address broadcasters $1220$ serially apply identical broadcast cells $1232_1$, $1232_2$, . . . , $1232_{320}$, via serial leads $1273_1$, $1273_2$, $1273_{320}$, to the north input, as cell $d_n$, of the first switching element in each column, e.g. element $1340_{1,1}$, $1340_{1,2}$, . . . , $1340_{1,320}$. At the same time as a broadcast cell is applied to first switching element $1340_{1,1}$ in the first contention unit, an incoming ATM cell, illustratively cell $1313$ is applied over input lead $1275_1$, as cell $d_w$, to the west input of the same switching element. Upon receipt of these two cells, switching element $1340_{1,1}$ begins a bit-by-bit comparison of specific corresponding address and specific corresponding priority bits in these cells. As discussed above, a switching element remains in a crossed state, such as that shown by lines $1342$, unless the corresponding addresses of both incoming cells match and the priority condition is met in which case that element assumes a non-crossed state as illustratively indicated by lines $1344$.

Now, by just focusing on the results of such comparisons that successively occur throughout the cells shown in FIG. 13 and ignoring synchronization, the manner in which individual cells are routed to different shared output lines in any one group becomes very clear. Inasmuch as the address, $A_2$, of incoming ATM cell $1313$ does not match the address, $A_1$, contained in each broadcast cell, then switching element $1340_{1,1}$ remains in a crossed state. As a result, this switching element routes incoming ATM cell $1313$ to its east output and broadcast cell $1232_1$ to its south output. The east output is connected, via lead $1384$, to the west input of switching element $1340_{1,2}$. The symbol "xx" within each incoming ATM cell indicates all remaining bits in that cell; these bits are not compared in a switching element but are merely routed therethrough. Since the address of incoming ATM cell $1313$ again fails to match the broadcast address contained in broadcast cell $1232_2$ that is simultaneously being applied to the north input of switching element $1340_{1,2}$, this switching element also remains in a crossed state. As a result, incoming ATM cell $1313$ is routed to the east output of element $1340_{1,2}$. In fact, since the address of this cell does not match the address, $A_1$, contained in any of the remaining cells broadcast by address broadcaster $1220_1$, incoming ATM cell $1313$ continues to successively propagate to the right, one switching element at a time, through contention unit $1270_{1,1}$. Eventually, this cell will reach the last switching element, i.e. element $1340_{1,320}$ in this unit after which the cell will simply be dropped off knocked off) the unit since it can propagate no further to the right. This is diagrammatically indicated by cell $1313$ situated to the right of element $1340_{1,320}$. As to broadcast cell $1232_1$ routed to the south output of element $1340_{1,1}$, this particular cell is serially applied on a bit-by-bit basis, via lead $1372_1$, to the north input of switching element $1340_{2,1}$. Concurrently with the arrival of this cell at this input, incoming ATM cell $1315$ is serially applied, also on a bit-by-bit basis, via lead $1275_2$, to the west input of the same switching element. Since the appropriate address, $A_1$, contained in incoming cell 1315 matches that in broadcast cell $1232_1$, switching element $1340_{2,1}$ proceeds to serially compare the appropriate priority bits contained in both of these cells. Inasmuch as incoming ATM cell 1315 contains a priority value of "2" which clearly exceeds the zero priority value contained in broadcast cell $1232_1$, switching element $1340_{2,1}$ assumes a non-crossed state, as shown by dashed lines 1344. Accordingly, incoming ATM cell 1315 is routed by this element to its south output while this element routes broadcast cell $1232_1$ to its east output. As such, broadcast cell $1232_1$ propagates to the right to switching element $1340_{2,2}$ wherein this cell is appropriately compared against to broadcast cell $1232_2$. Although the addresses of these two broadcast cells match, the priority of both cells is equal, specifically zero. Consequently, switching element $1340_{2,2}$ remains in a crossed state and routes broadcast cell $1232_1$, via its east output, to the right to a successive switching element in contention unit $1270_{2,1}$ for further comparisons and routes broadcast cell $1232_2$, via the south output of this switching element, downward to the north input of switching element $1340_{3,2}$. As ATM cell 1315 is being serially routed on a bit-by-bit basis from the south output of element $1340_{2,1}$ into the north input of switching element $1340_{3,1}$, incoming ATM cell 1317 is being serially routed, via lead $1275_3$, into the west input of this same switching element. Since the appropriate address, $A_1$, of both of these ATM cells match but the corresponding priority of cell 1317, being "1", is less than that of cell 1315, i.e. "2" in value, switching element $1340_{3,1}$ remains in a crossed state. As such, switching element $1340_{3,1}$ routes incoming ATM cell 1315 to its south output while routing incoming ATM cell 1317 to its east output and into the west input of switching element $1340_{3,2}$. As cell 1317 is being serially routed into element $1340_{3,2}$, broadcast cell $1232_2$ is being simultaneously applied to the north input of this same element. Inasmuch as the corresponding addresses of cells 1317 and $1232_2$ match but the priority of ATM cell 1317, being "1" in value, is higher than the zero-valued priority of the broadcast cell $1232_2$, switching element $1340_{3,2}$ assumes a non-crossed state. Consequently, this element routes incoming ATM cell 1317 to its south output while routing broadcast cell $1232_2$ to the right, via its east output, to a next successive switching element in contention unit $1270_3$. The cells appearing at the south outputs of all the individual switching elements within contention unit $1270_3$ are routed along with the timing and clock signals, via respective leads 1376, 1350 and 1366, to the next successive contention unit for comparisons against an incoming ATM cell appearing on a successive input line and so on throughout the remainder of column $1265_1$ (which contains these contention units) within grouping network 1100.

Thus, as can be readily appreciated, each incoming ATM cell enters a grouping network from the left and is first routed downward into a column of contention units and thereafter within that column is successively routed either downward or to the right as that cell propagates from one contention unit to the next through that column until the cells either reaches a shared output line or is simply "dropped" from a contention unit therein. The specific column through which that cell propagates downward in any grouping network is determined by the value of a corresponding routing address contained within that cell.

Figure 14:
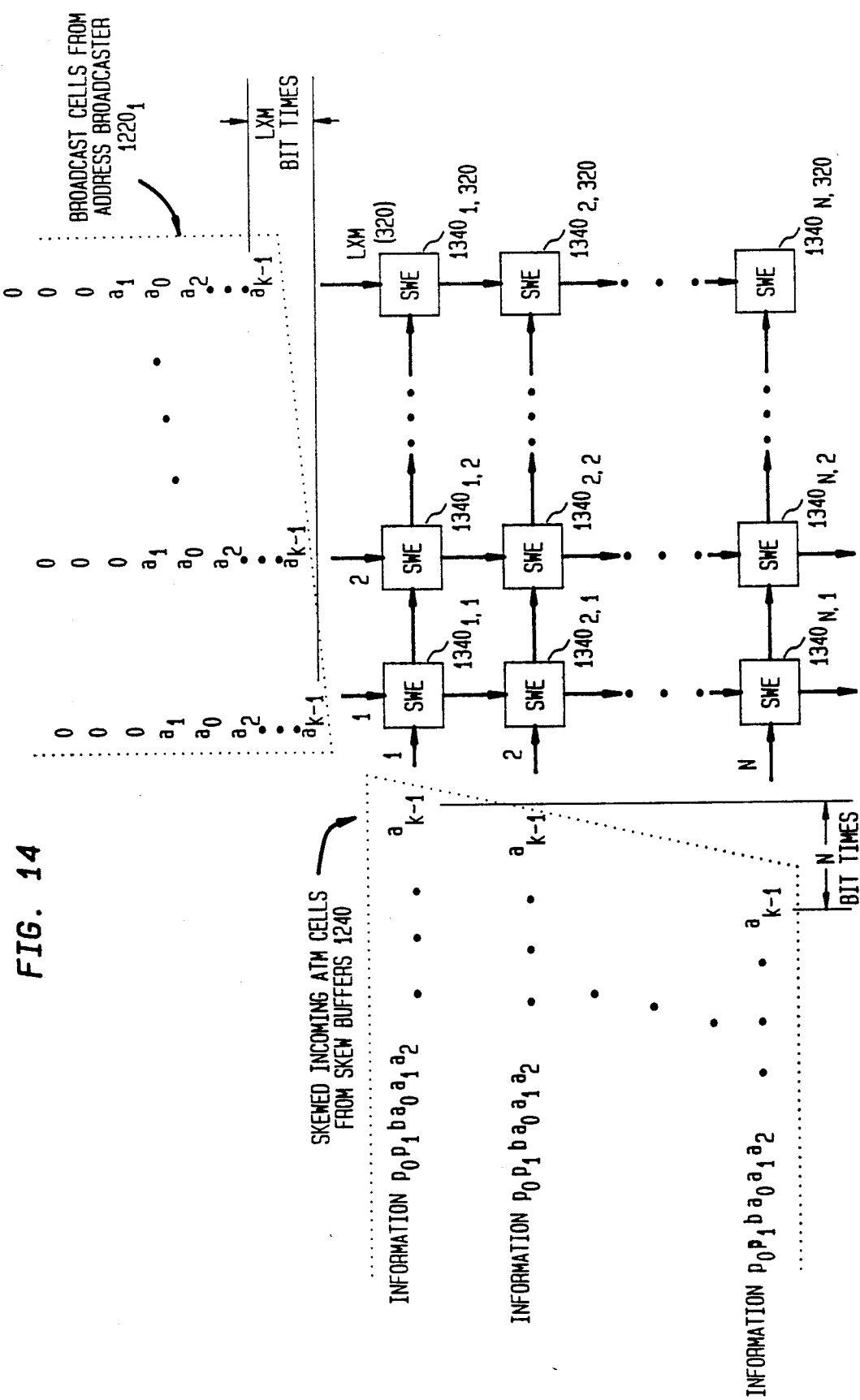
FIG. 14 diagrammatically shows the amount of skew that occurs between adjacent bit streams within a column of switching elements, specifically column $1265_1$, in grouping network 1110 shown in FIG. 12.

With this routing description in mind, to maintain appropriate synchronization among the switching elements in each column of a grouping network, the incoming ATM cells and broadcast cells applied to that column must be appropriately skewed, with the skew varying by one bit interval from each successive input or broadcast line to the next. In this regard, FIG. 14 diagrammatically shows the amount of skew that needs to occur between adjacent bit streams (both for incoming and broadcast cells) within a column of switching elements, specifically column $1265_1$, in grouping network 1110 shown in FIG. 12.

As shown, for grouping network 1110, the maximum timing skew applied to the incoming ATM cells is N bit times; while the maximum amount of timing skew applied to the broadcast cells is $L \times M$ bit times. Similarly, the maximum timing skew for the broadcast cells for grouping network 1140 and 1160 would be $L' \times M'$ bit times and $L''$ bit times, respectively. The timing skewed outputs from a grouping network can be directly fed to the inputs to the next successive grouping network without the need to include additional skew buffers therebetween.

Furthermore, two adjacent incoming ATM cells that originate from a common user line can be distributed within a grouping network such that one of these cells is directed to the leftmost link while the other cell is directed to the rightmost link within the same shared group of output links. As such, should this occur for grouping network 1110 (see FIG. 11), the timing difference between these two cells might be $C-(L \times M -1)$ bit times if the cell arrives at the right-most link, where C is the cell length in bits, and the second cell arrives at the left-most link, or $C+(L \times M -1)$ bit times if these cells arrive at the opposite links. Hence, to maintain proper cell sequencing throughout the entire grouping network, the number of vertical links in every group of shared outputs must be less than C to ensure that $C-(L \times M)>0$. With N input lines, the propagation delay for a cell passing through grouping network 1110 ranges from N to $N+(L \times M)$ bit times depending upon which particular shared output link that cell is delivered. For the entire three-stage network shown in FIG. 11, the total propagation delay ranges from $(N+L \times M+L' \times M')$ bit times to $(N+2 \times L \times M+2 \times L' \times M'+L'')$ bit times. Thus, for a ATM packet switch with 8192 separate input lines and implemented using my inventive recursively grouped distributed knockout switch, as described above with the illustrative numeric values for L, M, L' and L'' set forth above, the propagation delay for any ATM cell transiting through this switch will fall between 8,576 and 8,972 bit times or between 20 and 21 ATM cell time intervals, which equates to between approximately 57 to 61 $\mu$sec—which is quite acceptable.

As noted above, all the switching elements used in my inventive recursively grouped distributed knockout switch are identical. Thus, for purposes of illustration, FIG. 15 is a circuit diagram of one such switching element, illustratively element $1340_{1,1}$ shown in FIG. 13. Since FIG. 16 depicts various waveforms that occur within illustrative switching element $1340_{1,1}$, the reader should simultaneously refer to both FIGS. 15 and 16 throughout tho following discussion of this switching element.

As described above, each switching element performs a serial bit-by-bit comparison of corresponding address and priority bits of the serial bit streams of incoming cells applied to its north and west inputs in order to set the state of that element and route the incoming cells to either its east or south outputs. Ordinarily, the switching element remains in the crossed state. In this state, a current incoming cell that is being serially applied to the west input of that element is routed to its east output and a current incoming cell that is being serially applied to the north input of that element is routed to its south output thereof. However, if the address bits match and the priority condition is met by the cells currently applied to the west and north inputs, then that switching element will assume a non-crossed state. In this state, the element routes the incoming cell currently applied to the west input of that element to the south output and the incoming cell currently applied to the north input to the east output.

As shown, switching element $1340_{1,1}$ is formed of two portions: routing circuit 1503 and control circuit 1507. Routing circuit 1503 provides the routing paths from collectively the north and west inputs to collectively the south and east outputs as well as providing a daisy-chained interconnection for the x1 and x2 control signals to the next successive switching element. Control circuit 1507, relying on timing signals x1 and x2 and the bit serial signals appearing on the north and west inputs, controls the operation of the routing circuit. All the incoming signals are bit-synchronized with the clock (ck) signal. All the transistors used in the switching element are either P or N type field effect transistors (PFETs or NFETs).

Within routing circuit 1503, incoming timing signals x1 and x2 and serial incoming cells $d_n$ and $d_w$ which are simultaneously applied, via leads 1360, $1273_1$ and $1275_1$, to element $1340_{1,1}$ are each delayed by one bit interval through flip-flops 1510, specifically individual flip-flops $1510_1$, $1510_2$, $1510_3$ and $1510_4$ through which the x1 and x2 signals and $d_n$ and $d_w$ cells are respectively clocked by the clock signal applied to lead 1581. The output of flip-flop $1510_1$ is successively applied through inverters 1586 and 1588, the former providing control signal x1e bar (the term "bar" indicates negation). The delay imparted to the x1w signal by both of these inverters assures that timing signal x1e will overlap with timing signal x2e, thereby preventing the "match" signal, as described below, from incorrectly charging from a low to a high state while timing signal x2e is transiting from a high to a low state. The outputs of inverter 1588 and flip-flop $1510_2$ are respectively applied, as timing signals x1 and x2, through leads 1382 to the inputs of a next successive switching element in a contention unit. The suffixes "n", "e", "s" and "w" respectively denote the north and east inputs and the south and west outputs. The bit streams propagating through flip-flops $1510_3$ and $1510_4$, specifically $d_{n'}$ and $d_{w'}$, are inverted by inverters 1592 and 1594 to provide signals $d_{n'}$ bar and $d_{w'}$ bar. Bit streams $d_{n'}$ and $d_{w'}$ are applied to transmission gates 1520, which, through the state of the "cross" signal (to be described in detail below) buffered through inverters 1584 and incident on all the control inputs of these gates, routes these bit streams to the appropriate outputs, $d_s$ and $d_e$, respectively, for a crossed state or $d_e$ and $d_s$ in a non-crossed state. Transmission gates 1520 are formed of gates 1522, which route bit stream $d_{n'}$ or $d_{w'}$ to the south output, i.e. lead $1372_1$, and gates 1524, which route bit stream $d_{n'}$ or $d_{w'}$ to the east output, i.e. lead 1384. Gates 1520 and 1524 each contain two separate transmission gates which always operate in opposite modes.

As discussed above, switching element $1340_{1,1}$ ordinarily assumes the "crossed" state. In this state, the "cross" signal remains at a "high" level. Based upon the results of a serial bit-by-bit comparison of the appropriate address and, when necessary, priority bits of the two incoming cells, which occur within the corresponding timing windows established by timing signals x1 and x2, control circuit 1507 discharges the "cross" signal to a "low" level to change the routing provided by the switching element from a crossed to a non-crossed state.

Control circuit 1507 generates three distinct control signals: a "cross" signal, a "match" signal and a "stop" signal. The "cross" signal, as described above, sets the state of the transmission gates. This signal is initially at a high state and is placed in a low state only if an address match occurs between these cells and these cells also satisfy the priority condition. The match signal remains in a high state as long as each pair of corresponding address bits of the two incoming cells serially appearing on the north and west inputs match and, in the event of a complete address match, then throughout the remainder of the entire ATM cell time interval. The stop signal goes low as soon as the serial priority bit appearing at the west input is detected to be larger in value than the corresponding priority bit simultaneously appearing at the north input in order to cease all further such comparisons involving the two incoming bit streams on the north and east inputs throughout the remainder of the ATM cell time interval.

Now, to understand the operation of the switching element, assume that the "cross" signal is high. In fact, upon the start of every ATM cell time interval, the "cross", "match" and "stop" signals are all pre-charged to a high level. Specifically, at the start of an ATM cell time interval, timing signals x1e and x2e to PFETs 1552 and 1548 are low which cause these PFETs to conduct. Inasmuch as timing signal x1w is low, NFETs 1544 and 1546 are open-circuited. Consequently, the "match" signal, which occurs at the drains of PFETs 1548 and 1556, goes high which through inverter 1558 is applied to the gate of PFET 1556. Inasmuch as the signal appearing at the gate of PFET 1556 is low, this PFET is open-circuited. The output of inverter 1558 is also applied through inverter 1562 to the gate of NFET 1578 which causes this NFET to conduct. However, since timing signal x2e, which is applied to the gate of NFET 1576, is low, this NFET remains open-circuited during the address bit comparisons. Inasmuch as the drain of this NFET is connected to the source of NFET 1578, no current flows through either of these NFETs. Since the drain of NFET 1578 is serially connected to the source of NFET 1580, NFET 1580 does not conduct any current from its source to its drain if the "stop" signal is low. The drain of NFET 1580 is connected to the drain of PFET 1582. Inasmuch as timing signal x1e is low, this timing signal causes PFET 1582 to conduct which pulls the "cross" signal appearing at the source of this PFET to power level $+V_{DD}$ (a "high" level). As to the "stop" signal, this signal appears at the drain of PFETs 1572 and 1574 which are both connected through their drains to power level $+V_{DD}$. Inasmuch as timing signal x1e is low, this timing signal causes PFET 1572 to conduct. By virtue of the connection of the source of PFET 1572 to the drain of NFET 1566 and the low level of timing signal x2e which is applied to the gate of NFET 1566, this NFET remains off. Consequently, that "stop" signal is pulled up, through PFET 1572, to a high level. PFET 1574 also conducts due to the inversion of the "stop" signal provided by inverter 1570.

Figure 16:
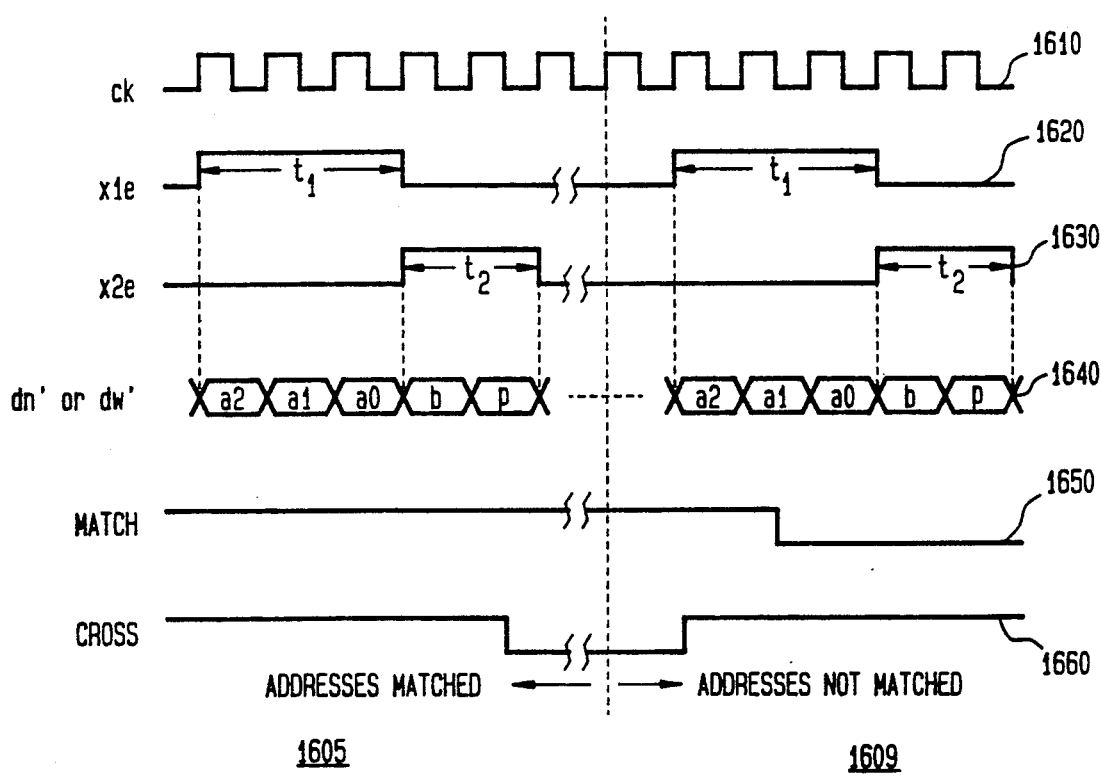
FIG. 16 depicts various waveforms that occur within illustrative switching element $1340_{1,1}$ shown in FIG. 15.

As specifically shown in FIG. 16, timing signals x1 and x2, illustratively indicated by waveforms 1620 and 1630, with the clock waveform indicated by waveform 1610, respectively define timing windows, $t_1$ nd $t_2$, that span the occurrence of address bits a2, a1 and a0, and busy bit b and priority bit p (these latter two bits being collectively considered, as noted above, as the priority bits). Two different situations are shown: situation 1605, in which the address bit match and the priority condition is met, and situation 1609 in which the address bits do not match.

It is only during timing window $t_1$ that control circuit 1507 will compare corresponding bits of both incoming cells applied to the north and west inputs to determine if the addresses of these cells as represented by these bits match each other. If such a match occurs, then control circuit 1507 will compare corresponding bits of both incoming cells applied to the north and west inputs during timing window $t_2$ to determine if the priority condition is met.

If, as occurs in situation 1605, an address match occurs and as soon as the priority condition is met for the two incoming cells (assumed to occur here at the last priority bit), then, upon the conclusion of the comparison of priority bit in both cells (which occurs half way through the corresponding bit time), the "match" signal, illustratively shown as waveform 1650 remains high but the "cross" signal, as depicted by waveform 1660, goes low. At this point in time, switching element $1340_{1,1}$ assumes the non-crossed state to appropriately route the last priority bit and all the remaining bits in both incoming cells to the appropriate outputs of switching element $1340_{1,1}$. Inasmuch as the preceding address and priority bits in the prepended routing header are the same between the two cells, these bits are routed, though in a crossed state, to both outputs during the bit times therefor. It must be noted that, owing to the inversion of the clock signal applied to NFET 1542, the clock bar signal prevents the "match" signal from being incorrectly discharged due to the overlap of the dn' and dw' bar signals, or the dn' bar and dw' signals. Bit comparisons occur during the second half of a corresponding bit time with the switching element changing state (and hence its routing pattern), if necessary, during this half of the bit time, specifically shortly after the falling edge of the clock signal. The falling edge defines the start of the second half of that bit time. Bit data provided by any cell is only valid at the end of the bit time, which occurs coincident with a rising edge of the clock signal. As such, the differing priority bits appear at the proper outputs of the switching element at the conclusion of the bit time. During the remaining bit times in the current ATM cell time interval, the remaining bits in the incoming cells then being applied to switching element $1340_{1,1}$ successively follow these priority bits to the proper outputs of this element.

Alternatively, as shown in situation 1609, if an address mismatch occurs during any bit comparison, such as for corresponding address bits a1, then the "match" signal, depicted by waveform 1650, falls to a low level during the second half of the bit time for the particular bits then being compared. As such, the "cross" signal, as depicted by waveform 1660, which was initially precharged to a high level, then remains high throughout the remainder for the current ATM cell time interval.

With respect to the remainder of the topology of control circuit 1507 itself, circuit 1530, formed of individual NFETs 1532, 1534, 1536 and 1538 being respectively connected to the dn', dn' bar, dw' bar and dw' signals, implements an exclusive OR gate. This gate is activated by NFET 1542. The outputs of this gate, i.e. the sources of NFETs 1536 and 1538, are both connected to the drain of NFET 1542. The clock (ck) bar signal is applied to the gate of NFET 1542; the source of this NFET is grounded. The drains of NFETs 1536 and 1538 are respectively connected to the sources of NFETs 1532 and 1534 which, in turn are respectively connected to the sources of NFETs 1566 and 1576. These source-drain connections are themselves respectively connected through NFETs 1544 and 1546 which are both commonly driven by signal x1w' applied to their gates. The drains of NFETs 1544 and 1546 are connected together to the drains of PFETs 1548 and 1556 and the input of inverter 1558. The x2e signal is applied to the gate of NFET 1566 with its drain, at which the "stop" signal is generated, being connected to the drains of PFETs 1572 and 1574.

Bit comparisons are performed within exclusive OR gate 1530. Owing to the application of the ck (clock) bar signal to NFET 1542, either leg of gate 1530 is able to sink current through NFET 1542 only during the second half of any bit interval (when the ck bar is high). As such, this gate is active only during this half of any bit time. At the beginning of the time window that spans the occurrence of the address bits, timing signal x1w' assumes a high level and remains high throughout this window. Accordingly, the high level x1e signal causes NFETs 1544 and 1546 to both become conductive. However, PFETs 1552 and 1548 assume a non-conductive state. The "match" signal occurring at the drains of NFETS 1544 and 1546 remains high due to conducting PFET 1556. Now, upon the occurrence of a mismatch between corresponding address bits, both NFETs in one leg (NFETs 1532 and 1536) or the other (NFETs 1534 and 1538) of gate 1530 will conduct and sink current through NFET 1542. As such, the drain of either NFET 1532 or 1534 will be pulled low, i.e. grounded. Inasmuch as signal x1w, is high during this time, NFETs 1544 and 1546 will also be conducting. Consequently, as soon as a mis-match occurs, the drains of NFET 1544 or 1546 will be pulled to ground thereby causing the level of the "match" signal to assume a low state. This low state, in turn, will turn off PFET 1556 and NFET 1578. Inasmuch as the x2e signal has not yet occurred, NFET 1576 will have been off during all preceding address bit comparisons. Inasmuch as NFET 1578 will now be turned off, the occurrence of the x2 timing window, during which the x2e signal goes high, will not cause current to be conducted through PFET 1582 and NFET 1580. Consequently, the "cross" signal appearing at the drain of PFET 1582 will remain high and will not change during the remainder of the ATM cell time.

If, as discussed above, all the address bits match, then the priority bits are successively compared on a bit-by-bit basis. At the beginning of the time window that spans the occurrence of the priority bits, timing signal x2 assumes a high level and remains high throughout this window. This causes NFETs 1566 and 1576 to both become conductive. However, PFET 1548 maintains a non-conductive state. The "match" signal occurring at the drains of NFETS 1544 and 1546 continues to remain at a high level due to conducting PFET 1556. Now, upon the occurrence of a mismatch between corresponding priority bits, both PFETs in one leg of gate 1530 (PFETs 1532 and 1536) or the other leg (PFETs 1534 and 1538) conduct and sink current through conducting PFET 1542. Inasmuch as the priority condition is only satisfied if the priority of the cell appearing on the west input is higher than the priority of the cell simultaneously appearing on the north input, then only one of the two exclusive OR combinations provided by exclusive OR gate 1530 is permitted to cause the "cross" signal to change. This condition is given by inputs dn' bar and dw' to gate 1530 and is isolated from the other output of this gate by non conducting NFETs 1544 and 1546. At the occurrence of a desired mismatch between the priority bits, NFETs 1534 and 1538 situated within gate 1530 conduct. Due to the isolation of the "match" signal from gate 1530 due to non-conducting NFETs 1544 and 1546, the "match" signal remains at a high level once the address comparisons have completed and throughout all the priority bit comparisons. Now, inasmuch as the drain of NFET 1534 will be pulled to ground, through conducting NFETs 1538 and 1542, at the occurrence of the priority condition, this provides a discharge path, through conducting NFETs 1576, 1578 and 1580, for stored charge situated at the drain of PFET 1582. Inasmuch as PFET 1582 is open circuited throughout all priority bit comparisons, the "cross" signal is discharged to zero upon the occurrence of the priority condition and remains at a low level for the remainder of the ATM cell interval time. Hence, switching element $1340_{1,1}$ assumes the non-crossed state at the occurrence of the priority condition and thereafter remains in this state throughout the remainder of the ATM cell time interval.

In the event a mis-match occurs in the priority bits, but in the reverse direction, i.e. the value of a priority bit for the cell applied to the north input is "one" while the corresponding bit for the cell applied to the west input is "zero" valued, then switching element $1340_{1,1}$ is to remain in the crossed state at this point and continue in this state thereafter throughout the remainder of the ATM cell time interval regardless of the states of the remaining priority bit(s) in these cells. Specifically, in the event that such a mis-match occurs in the priority bits, then NFETs 1532 and 1536 in gate 1530 both become conductive. Once this occurs, a discharge path is provided through these FETs, NFET 1542 and NFET 1566 for the stored charge then appearing on the drain of NFET 1566. Inasmuch as PFET 1572 remains non-conductive during priority bit comparisons, the "stop" signal, which appears at the drain of NFET 1566, decreases to zero. By virtue of inverter 1570 and PFET 1574, the "stop" signal will then remain at a zero level throughout the remainder of the ATM cell time interval. Inasmuch as the "stop" signal is applied to the gate of NFET 1580, this signal will cause this to become open-circuited which, in turn, will cause the stored charge at the drain of PFET 1582 to substantially remain there. Since signal x1e bar remains at a high level subsequent to all the address comparisons during an ATM cell time interval, then, PFET 1582 is also non-conductive during this time. Now, owing to the non-conductive state of PFET 1582, any stored charge lost due to self-discharge occurring within NFET 1580 will not be replenished during the remainder of the ATM cell time interval.

I have performed simulations of an implementation of switching circuit $1340_{1,1}$ using well known "SPICE" software programs and through these simulations have confirmed the operation of the circuit at rates in excess of 250 Mbit/second.

Advantageously, my inventive switching element contains a relatively small number of transistors which can be reduced to approximately 55 transistors if flip-flops $1510_1$ and $1510_2$ along with gates 1586 and 1588 are moved to a centralized circuit that distributes the x1 and x2 signals to all the switching elements on the same column or row. If a 64-by-64 (approximately 4,000) matrix of identical switching elements were to be integrated on a single integrated circuit, this circuit would contain on the order of 300,000 transistors which is within the limitations of currently available 1 micron VLSI CMOS technology.

E. Grouping network based trunk circuits

A packet switch is often connected through a trunk to another such switch such as, for example, one situated at a remote central office. By virtue of the trunked connection, all the channels provided by that trunk are available to carry packet traffic. Hence, a group of trunked channels can be shared among the individual outputs provided by the originating switch in order to provide multiple virtual paths for each virtual circuit connection. As such, cells carrying an identical VCI field can be routed through any one of a number of individual channels that constitute the same grouped channel or have the same routing address. Channel grouping can be readily incorporated into an ATM switch to improve its performance in terms of throughput (if input buffering is used therein), cell delay and cell loss probability.

In this fashion, rather than incorporate separate output buffers and internal queues to drive individual output lines, as depicted in the embodiment shown in FIG. 11, a grouped channel connection would preferably take the place of output buffers 1170 or, if output buffers are needed to provide output synchronization, at least permit the size of the queue in each of these buffers to be reduced. In the latter case, whenever the buffer for one such channel becomes full, then incoming cells are simply routed to the next output line for carriage over the next channel in the same grouped channel. As such, through the use of a grouped channel, multiple servers can access every channel in that group.

Figure 17A:
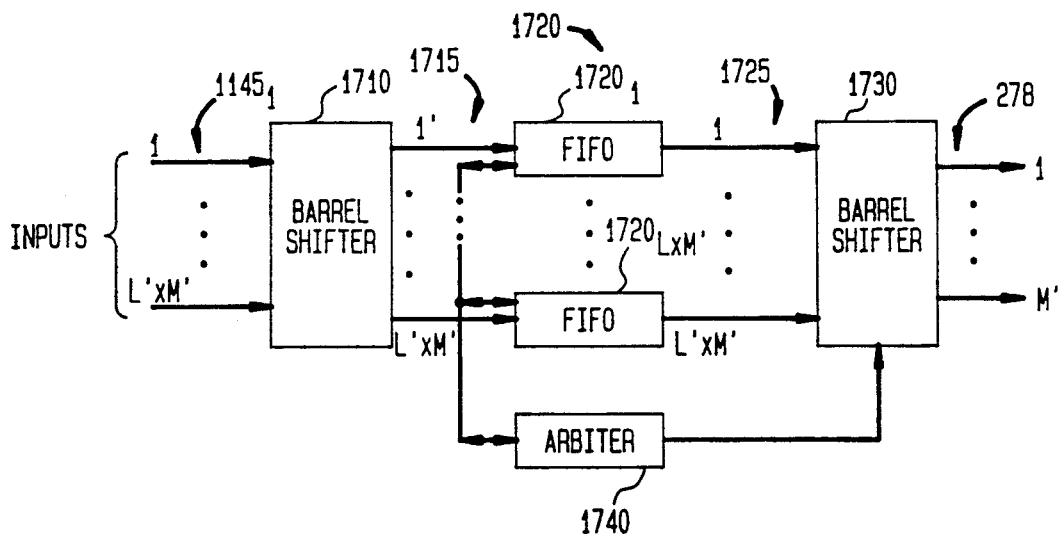
FIG. 17A shows a block diagram of one embodiment of a L'×M' to M' concentrator for incorporating channel grouping, through space division multiplexing, into my inventive recursively grouped distributed knockout switch shown in FIG. 11.
Figure 17B:
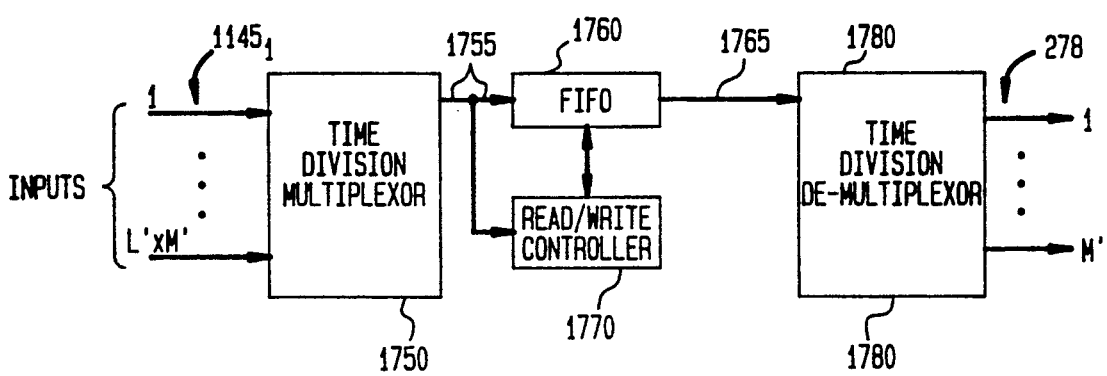
FIG. 17B shows a block diagram of a second embodiment of an L'×M' to M' concentrator that can also be used to incorporate channel grouping, here through time division multiplexing, into my inventive recursively grouped distributed knockout switch shown in FIG. 11.

To incorporate channel grouping into my inventive switch while preserving the order in which individual cells are delivered over a grouped channel to a packet switch, each of the modules 1150 shown in FIG. 11 could be replaced with an $L' \times M'$ to $M'$ concentrator. Through use of such a concentrator, the cell order is associated with pre-defined channel positions, in a top to bottom ordering. Also, all the channels in a common channel group, are transmitted over the same physical transmission line thereby experiencing the same propagation delay. For example, sixteen STS-3c channels can be byte-interleaved into an STS-48 bit stream (approximately 2.5 Gbit/second) and transmitted on a common fiber trunk to the next switch node. FIGS. 17A and 17B collectively show two separate embodiments of an appropriate $L' \times M'$ to $M'$ concentrator.

In particular, FIG. 17A shows a block diagram of one embodiment of an $L' \times M'$ to $M'$ concentrator that provides concentration through space division multiplexing. Specifically, this concentrator contains barrel shifters 1710 and 1730, FIFOs 1720 which are formed of individual FIFOs $1720_1, ..., 1720_{L' \times M'}$, and arbiter 1740.

Incoming ATM cells appearing on leads $1145_1$, these leads constituting shared output group 1 from grouping network 1140 shown in FIG. 11, are shifted through barrel shifter 1710, shown in FIG. 17A, and written in round-robin order into FIFOs 1720. Barrel shifter 1710 records the number of incoming ATM cells that pass through it during the last ATM cell time interval and then shifts all its inputs in one direction to corresponding outputs, with numeric address of each specific output being offset from its associated input by the value of the recorded number. The cells provided at the outputs of barrel shifter 1710 are routed, via $L' \times M'$ leads 1715, to respective inputs of FIFOs 1720. After the incoming cells are written into all the FIFOs, only $M'$ such cells can be simultaneously read out therefrom. Arbiter 1740, which is connected to each of the FIFOs, decides which FIFOs are to be read during any one cell. The arbiter also records the number of ATM cells that are read out in each current ATM cell time interval and will instruct barrel shifter 1730 to shift its input lines by the same number. If during a read operation, a FIFO is empty, then an idle cell is merely sent out the barrel shifter 1730 and that FIFO is not accessed Barrel shifter 1730 provides $M'$ outputs which collectively, via leads 278, provide $M'$ shared outputs that form a common grouped channel. Barrel shifters 1710 and 1730, which collectively preserve proper cell ordering, can each be replaced with a running adder address generator cascaded with a reverse banyan network.

FIG. 17B shows a block diagram of a second embodiment of an $L' \times M'$ to $M'$ concentrator that provides concentration through time division multiplexing. Specifically, this concentrator contains time division multiplexor 1750, FIFO 1760, read/write controller 1770 and time division demultiplexor 1780. Simultaneously occurring incoming ATM cells appearing on $L' \times M'$ leads $1145_1$ are multiplexed in a time division manner into a serial bit stream which is applied as input to and stored within FIFO 1760. The contents of the FIFO are serially accessed and demultiplexed on a cell-by-cell basis into $M'$ separate output leads 278 by time division demultiplexor 1780. Read/write controller 1770, which also receives the multiplexed bit stream, controls the operation of FIFO 1760 by examining the "busy" bit contained within each multiplexed cell and, based upon the state of that bit, determines whether that cell is to be written into (or read from) FIFO 1760. Although the second embodiment shown in FIG. 17B is simpler than the first embodiment shown in FIG. 17A, FIFO 1760 must operate at a speed that is $L' \times M'$ times faster than that of each individual FIFO in FIFOs 1720 shown in FIG. 17A or utilize an increased word length such that all $L' \times M'$ ATM cells can be stored in one ATM cell interval. With the second embodiment, the values of $L'$ and $M'$ not only need to be selected to achieve a desired cell loss probability, such as $10^{-10}$, but also such that the size of the FIFO and its required speed are both compatible with available technology. Alternatively, the $M'$ value can be kept constant across all the grouping networks in module 1130 (see FIG. 1) and use a grouping network within module 1150 that provides multiple groups of $L'' \times M''$ outputs, where $L''$ and $M''$ are selected to provide an appropriate number of shared output lines in each such group.

F. Grouping network based statistical multiplexors

My inventive grouping network can also be used to advantageously implement a bufferless statistical multiplexor. Such a multiplexor could be used in an input module to implement a multiple-input, multiple-output (MIMO) multiplexor to provide line concentration. Although a multiple input, single-output (MISO) multiplexor is relatively simple to implement, a MIMO multiplexor, owing to statistical smoothing of the large number of input sources served by multiple outputs, advantageously has a smaller cell loss probability resulting from buffer overflow as well as imparting less average delay to cells propagating therethrough than would occur with an MISO multiplexor.

Furthermore, cell traffic is typically bursty in nature. Interface modules known in the art typically include input buffers to absorb incoming bursts. However, use of such buffers tends to increase circuit complexity, decrease throughput and present difficulties in synchronizing incoming cells and preserving proper cell sequencing among different input lines. Use of my inventive statistical multiplexor advantageously eliminates the need for such input buffers and the difficulties associated therewith.

FIG. 18 shows a block diagram of a second embodiment of an interface module that can be utilized in B-ISDN switch 200 shown in FIG. 2 and specifically a module implemented using a bufferless MIMO statistical multiplexor implemented through a grouping network in accordance with the teachings of my invention.

As shown, interface module 1800 contains statistical MIMO multiplexor 1810, header processing units 310 containing individual header processing units $310_1, \ldots, 310_{186}$, and 16-to-1 time division multiplexors 1830 containing individual time division multiplexors $1830_1, \ldots, 1830_{12}$. Statistical multiplexor 1810 receives incoming ATM cells over incoming STS-3c user lines $205_1$ which collectively contain 1024 separate user lines and multiplexes these incoming cells onto output leads 1815. Statistical multiplexor 1810 is implemented with a grouping network, as described in detail above, where the number of individual leads in output leads 1815 is chosen such that the cell loss probability through the network is reduced to an acceptable value. Through such a grouping network, there will exist a group expansion ratio (L) such that the number of outputs can be expanded from "M" to "$L \times M$" such that the probability of lost cells due to contention within the network will be appropriately reduced. For example, with 1024 incoming lines and M set equal to the value 128 for a concentration ratio of 8, then, to provide a cell loss probability of $10^{-10}$, the value of L, as set forth in Table 1 above, is 1.45. Accordingly, the number of separate outputs provided by the grouping network in statistical multiplexor 1810 will be $128 \times 1.45$ or approximately 186. As long as the number of these outputs is less than the number of bits in an incoming ATM cell, cell sequencing will be preserved by multiplexor 1810. Accordingly, multiplexor 1810 is configured to produce 186 separate outputs. Each different output is connected through a separate lead within leads 1810 to a corresponding header processing unit. The header processing unit, as described above, translates the VCI of each cell, over-writes the translated VCI into the cell and prepends a three stage routing header to that cell. Header processing units $310_1, \ldots, 310_{186}$ are connected to leads $1815_1, \ldots, 1815_{186}$. The resulting ATM cells produced by the header processing units are directed, via leads 1829, to 16-to-1 time division multiplexors, specifically multiplexors $1830_1, \ldots, 1830_{12}$, which multiplex the ATM cells on a 16-to-1 basis to form outgoing STS-48 trunks 215₁. As discussed above, all header processing units 310 are connected through lines 245 to switch control module 290 and are controlled thereby.

For ATM cell traffic flowing in an opposite direction, such as from STS-48 trunks to user lines, a statistical demultiplexor implemented through a well known expansion network could be used. The expansion network would provide the inverse function of a grouping network and hence would not be implemented with a grouping network.

Alternatively, my inventive statistical multiplexor could be tightly coupled to my recursively grouped distributed knockout switch. To accomplish this, the multiplexor would be placed in series with the input lines to switch 1100 shown in FIG. 11. Since the grouping network in the statistical multiplexor will appropriately skew the incoming ATM cells from each input line to the next as they pass through the statistical multiplexor, the cells provided by this multiplexor could be routed directly into a grouping network in the knockout switching circuit, such as first stage grouping network 1110, without the need to pass through any additional skew buffers. As such, the statistical multiplexor would be tightly coupled into the knockout switching circuit itself rather than residing in a separate module, such as within interface module 1800 shown in FIG. 18. This alternative approach would increase the number of switching elements in the switch inasmuch as the input port count for the first stage grouping network will have increased from N to L×N. As an example, for an ATM switch with 8192 inputs and using 1024-to-128 statistical input multiplexors, the total number of switching elements in this switch would increase from $1.42N^2$ to $1.98N^2$. Of these $1.98N^2$ switching elements, $0.19N^2$ switching elements would be used to implement 64 required (8192/128) statistical multiplexors.

Clearly, by now, those skilled in the art realize that although my inventive distributed and recursively grouped distributed knockout switches have been described as performing B-ISDN switching at the STS-3c rate (approximately 150 Mbit/second), B-ISDN switching at higher rates can be provided while still preserving the sequencing of input cells. Such higher speed switching can be readily obtained by dedicating an appropriately sized group of successive input and output ports to associated incoming and outgoing high speed trunks and utilizing appropriately sized input demultiplexors and output multiplexors. Specifically, to handle an STS-12 trunk, which carries ATM cell traffic at four times the STS-3c rate or at approximately 600 Mbit/second, a group of four successive input ports could be dedicated to an incoming STS-12 trunk. A 1-to-4 time division demultiplexor could precede these input ports and convert an incoming STS-12 serial bitstream into four STS-3c streams. Each of these streams could feed a corresponding one of the four input ports to the switch. Tho individual outputs from a group of four successive output ports on the switch could be multiplexed together, again on a 1-to-4 time division basis, to feed an outgoing STS-12 trunk. Inasmuch as either of the inventive switches preserves cell ordering therethrough and the time division multiplexing and demultiplexing for the high speed trunk(s) occur in the same order, my inventive switches would advantageously preserve the ordering of the bits on a high speed trunk entirely through the switch at multiples of the STS-3 rate.

Although various embodiments which incorporate the teachings of the present invention have been shown and described in detail herein, those skilled in the art can readily devise many other varied embodiments that still incorporate these teachings.

I claim:

1. A packet switch network comprising a matrix of individual switch elements, each of said switch elements having
   first and second data inputs, a timing signal input, a clock signal input, and first and second data outputs, the outputs of a switch element in said matrix being inputs to two different switch elements in said matrix,
   circuit control means responsive to clock signals and to first and second incoming but stream applied on a substantially simultaneous basis to said first and second data inputs, respectively, and a timing signal on said timing signal input, for performing serial bit comparisons between corresponding bits of said first and second incoming bit streams during a time window defined by said timing signal and, in response thereto, for generating a control signal that assumes a state dependent upon the occurrence of a predetermined logical condition between said first and second incoming bit streams, and
   routing means responsive to said clock signals and to said control signal for routing bits comprising first and second incoming bit streams from said first and second data inputs, respectively, to said first and second data outputs for one state of said control signal or to said second and first data outputs for a second state of said control signal, thereby determining to which next adjacent switch element in said matrix said data inputs are transmitted,
   said control circuit means further comprising means for changing the state of said control signal from said one to said second state, if the first portion of said corresponding first and second bit streams applied to said first and second data inputs match and if the value of a second portion of said second bit stream applied to said second data input exceeds the value of a corresponding second portion of said first bit stream applied to said first data input, and
   wherein said first portions of said bit streams comprise address bits of first and second packets being serially applied to said first and second data inputs, and said second portions of said bit streams comprise priority bits of said first and second packets and
   wherein said timing signal comprises first and second timing signals, said first timing signal defining a first time window during which address bits are being serially applied from said first and second incoming bit stream to said first and second data inputs and said second timing interval defining a second time window which occurs after the first time window and during which priority bits are being serially applied from said first and second incoming bit streams to said first and second data inputs.

2. A packet switch network in accordance with claim 1 wherein said routing circuit means further comprises:
   first means for delaying each of said first and second incoming bit streams appearing on said first and second data inputs by a pre-defined interval so as to produce delayed first and second incoming bit streams; and transmission gate means, responsive to said delayed first and second incoming bit streams and to said control signal, for applying bits in said delayed first and second incoming bit streams to said first and second data outputs or to said second and first data outputs.

3. A packet switch network in accordance with claim 2 wherein said routing circuit means further comprises:

second means for delaying said first and second timing signals so as to produce delayed timing signals; and means for applying said delayed first and second timing signals to respective first and second timing signal outputs from said switching element.

4. A packet switch network in accordance with claim 3 wherein said control circuit means further comprises:

means for initializing first and second intermediate signals to a pre-determined logical state at the beginning of a current packet time interval;

comparison means, responsive to said delayed first and second incoming bits and to the occurrence of the first and second time windows, respectively for comparing the corresponding address bits and setting said first intermediate signal in a logical state opposite to said pre-determined state in the event a mis-match occurs between said corresponding address bits during said first time window and for comparing the corresponding priority bits and setting said second intermediate signal in the opposite logical state in the event a value of the priority bit incoming on said first data input exceeds a value of the corresponding priority bit incoming on said second data input during said second time window;

means, responsive to either said first or second intermediate signals in the opposite logical state respectively occurring during said first or second time windows, for setting said control signal in said first state and for maintaining said control signal in said first state throughout a remainder of the current packet time interval; and means, responsive to the opposite logical state of the second intermediate signal, for isolating said control signal from being affected by any subsequent priority bit comparisons occurring during said current packet time interval.

5. In a switching element for use in a packet switch, said element having a control circuit and a routing circuit, said routing circuit having first and second data inputs thereto and first and second data outputs therefrom, a method comprising the steps of:

in said control circuit:

performing, in response to first and second incoming bit streams applied on a substantially simultaneous basis to said first and second data inputs, respectively, clock signals, and a timing signal, serial bit comparisons between corresponding bits of said first and second incoming bit streams during a time window defined by said timing signal and generating, in response to said performing step, a control signal that assumes a pre-defined logical state upon the occurrence of a pre-determined logical condition between said first and second incoming bit streams; and in said routing circuit:

respectively routing, in response to the first or second state of said control signal, bits comprising first and second incoming bit streams from said first and second data inputs to said first and second data outputs or to said second and first data outputs, and further in said control circuit:

changing the state of said control signal from a first state to a second state, if corresponding first and second pluralities of bits being serially applied as said first and second incoming bit streams to the first and second data inputs match and subsequently thereto if a value of a third plurality of bits serially applied to the second data input exceeds a value of corresponding fourth plurality of bits serially applied to the first data input, and wherein said first and second pluralities of bits comprise address bits of first and second packets being serially applied to said first and second data inputs, and said third and fourth pluralities of bits comprise priority bits of said first and second packets, and wherein said timing signal comprises first and second timing signals, said first timing signal defining a first time window during which address bits are being serially applied from said first and second incoming bit streams to said first and second data inputs and said second timing interval defining a second time window which occurs after the first time window and during which priority bits are being serially applied from said first and second incoming bit streams to said first and second data inputs.

6. The method in accordance with claim 5 further comprising in said routing circuit the steps of:

first delaying each of said first and second incoming bit streams appearing on said first and second data inputs by a pre-defined interval so as to produce delayed first and second incoming bit streams; and applying, in response to said delayed first and second incoming bit streams and to said control signal, bits in said delayed first and second incoming bit streams to said first and second data outputs or to said second and first data outputs.

7. The method in accordance with claim 6 further comprising in said routing circuit the steps of:

second delaying said first and second timing signals so as to produce delayed timing signals; and applying said delayed first and second timing signals to respective first and second timing signal outputs from said switching element.

8. The method in accordance with claim 7 further comprising in said control circuit the steps of:

initializing first and second intermediate signals to a pre-determined logical state at the beginning of a current packet time interval;

in response to said delayed first and second incoming bits and to the occurrence of the first and second time windows, comparing the corresponding address bits and setting, in the event a mis-match occurs between said corresponding address bits during said first time window, said first intermediate signal in a logical state opposite to said pre-determined state and comparing the corresponding priority bits and setting, in the event a value of the priority bit incoming on said first data input exceeds a value of the corresponding priority bit incoming on said second data input during said second time window, said second intermediate signal in the opposite logical state;

setting, in response to either said first or second intermediate signals in the opposite logical state respectively occurring during said first or second time windows, said control signal in said first state and maintaining said control signal in said first state throughout a remainder of the current packet time interval; and isolating, in response to the opposite logical state of the second intermediate signal, said control signal from being affected by any subsequent priority bit comparisons occurring during said current packet time interval.

9. A packet switch comprising a plurality of user lines, a network comprising a matrix of individual switch elements, and means connecting said plurality of user lines to said matrix, and wherein each of said switch elements in said matrix has first and second data inputs, a timing signal input, a clock signal input, and first and second data outputs, the outputs of a switch element in said matrix being inputs to two different switch elements in said matrix, and each of switch elements further comprises circuit control means responsive to clock signals and to first and second incoming bit streams applied on a substantially simultaneous basis to said first and second data inputs, respectively, and a timing signal distinct from said clock signals on said timing signal input, for performing serial bit comparisons between corresponding bits of said first and second incoming bit streams during a time window defined by said timing signal and, in response thereto, for generating a control signal that assumes a state dependent upon the occurrence of a predetermined logical condition between said first and second incoming bit streams, and routing means responsive to said clock signals and to said control signal for routing bits comprising first and second incoming bit streams from said first and second data inputs respectively to said first and second data outputs for one state of said control signal or to said second and said first data outputs for a second state of said control signal, thereby determining to which next adjacent switch element in said matrix said data inputs are transmitted.

* * * * *